Dec. 5, 1939.    G. TAUSCHEK    2,182,006
TABULATING MACHINE
Filed Dec. 19, 1934    15 Sheets-Sheet 1

INVENTOR.
Gustav Tauschek
BY
ATTORNEYS.

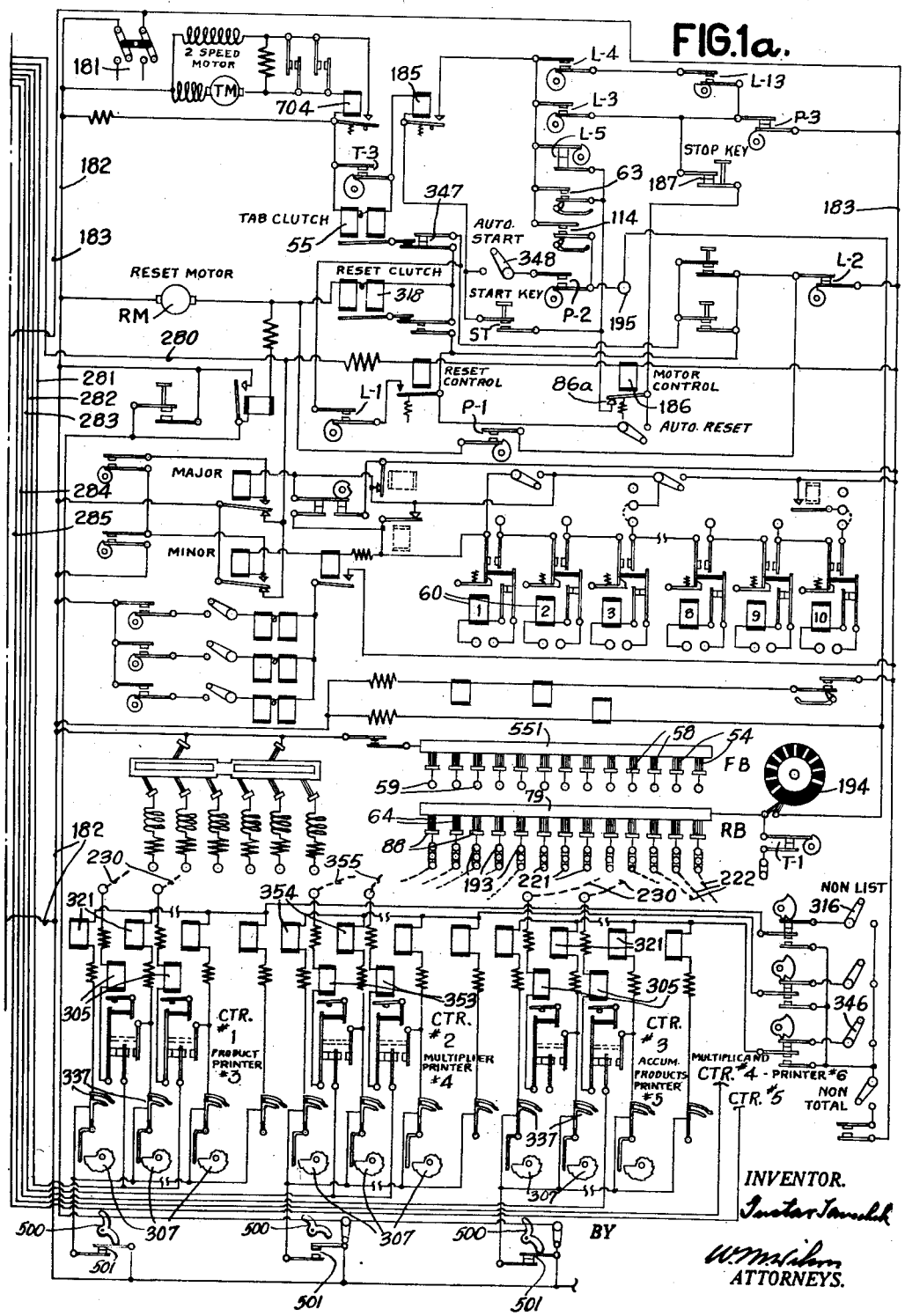

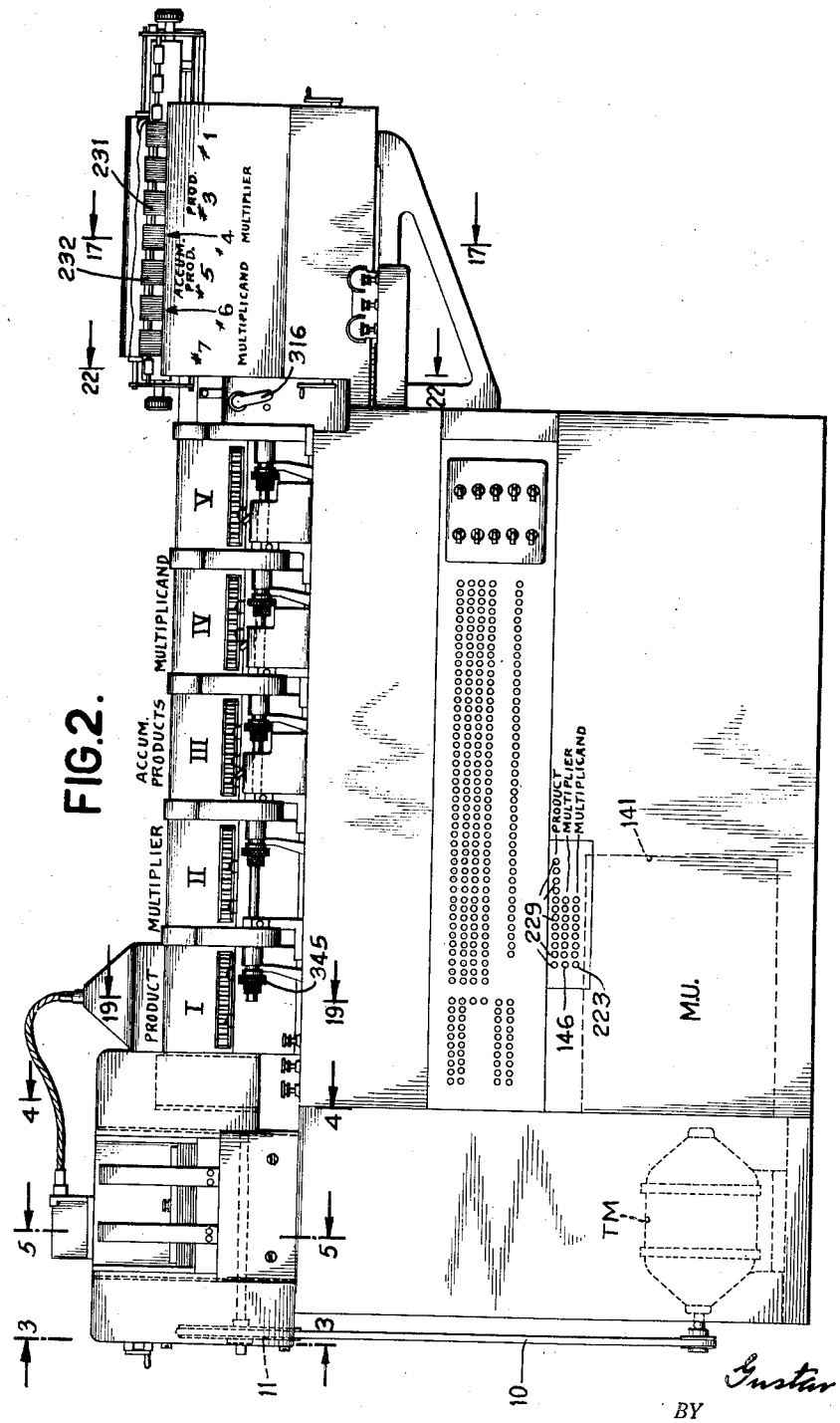

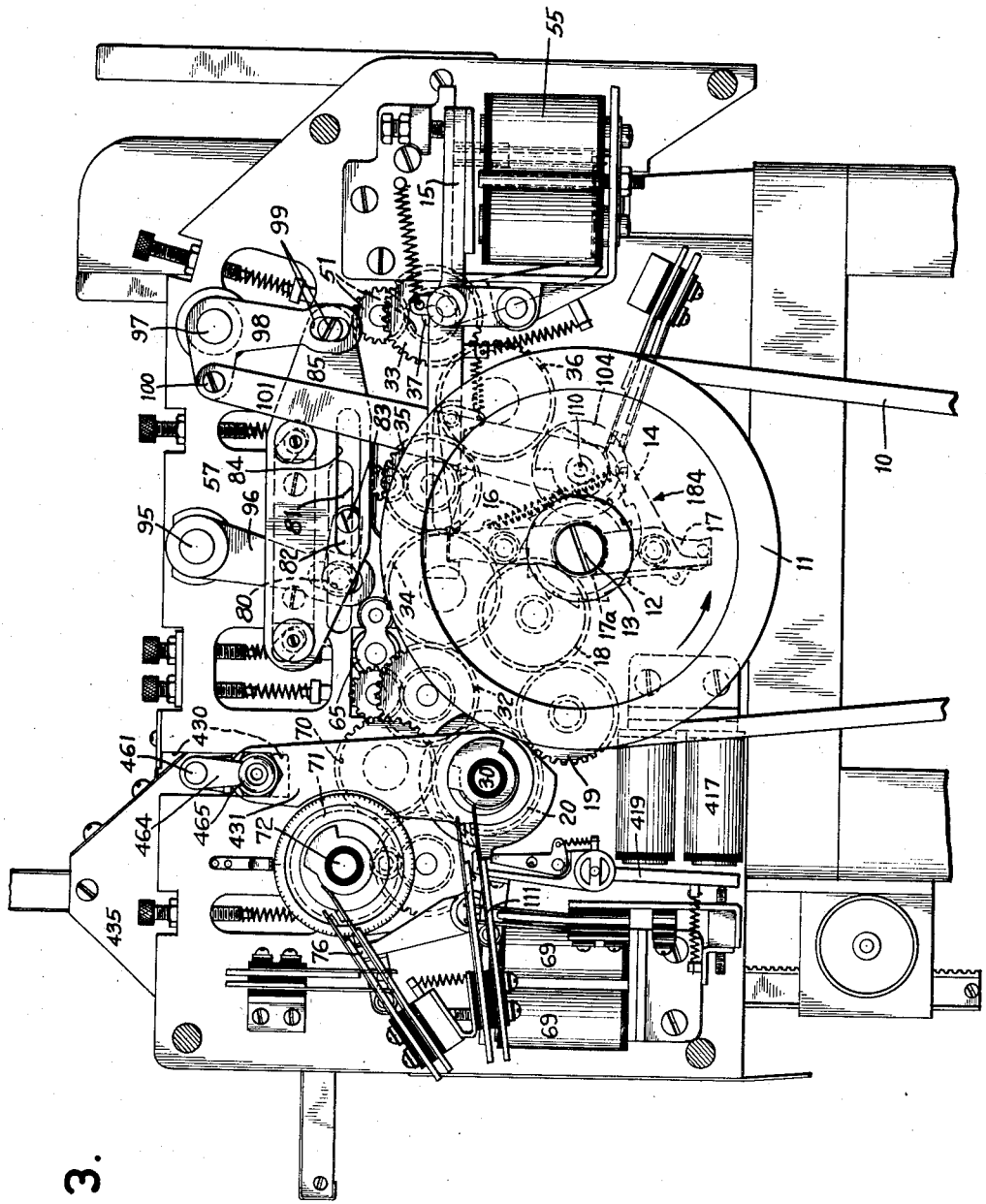

Dec. 5, 1939.  G. TAUSCHEK  2,182,006
TABULATING MACHINE
Filed Dec. 19, 1934  15 Sheets-Sheet 5
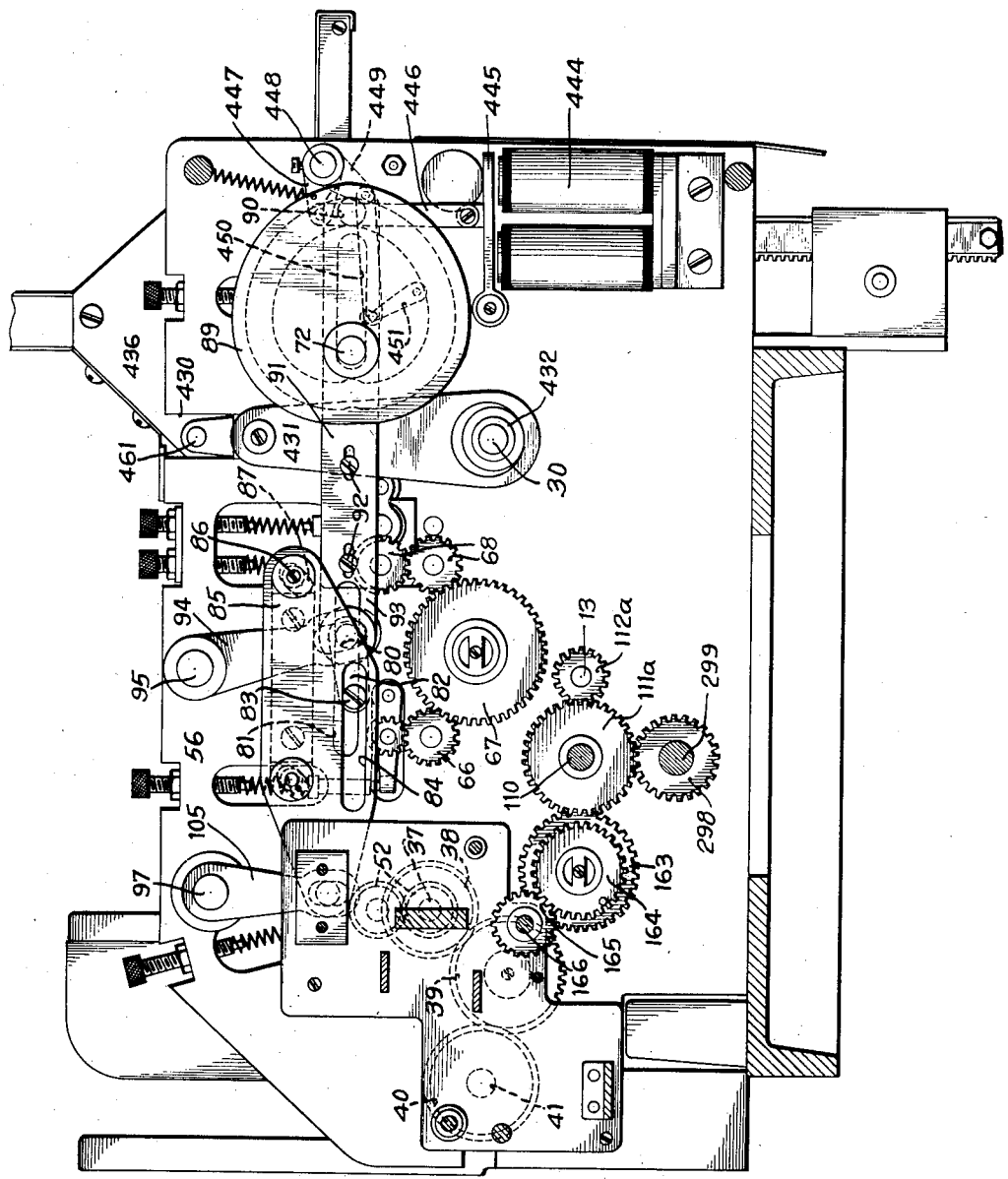
FIG. 4.
INVENTOR.
BY
ATTORNEYS.

Dec. 5, 1939.     G. TAUSCHEK     2,182,006
TABULATING MACHINE
Filed Dec. 19, 1934     15 Sheets-Sheet 7

INVENTOR.
Gustav Tauschek
BY
ATTORNEYS.

Dec. 5, 1939.    G. TAUSCHEK    2,182,006
TABULATING MACHINE
Filed Dec. 19, 1934    15 Sheets-Sheet 8

INVENTOR.
Gustav Tauschek
BY
ATTORNEYS.

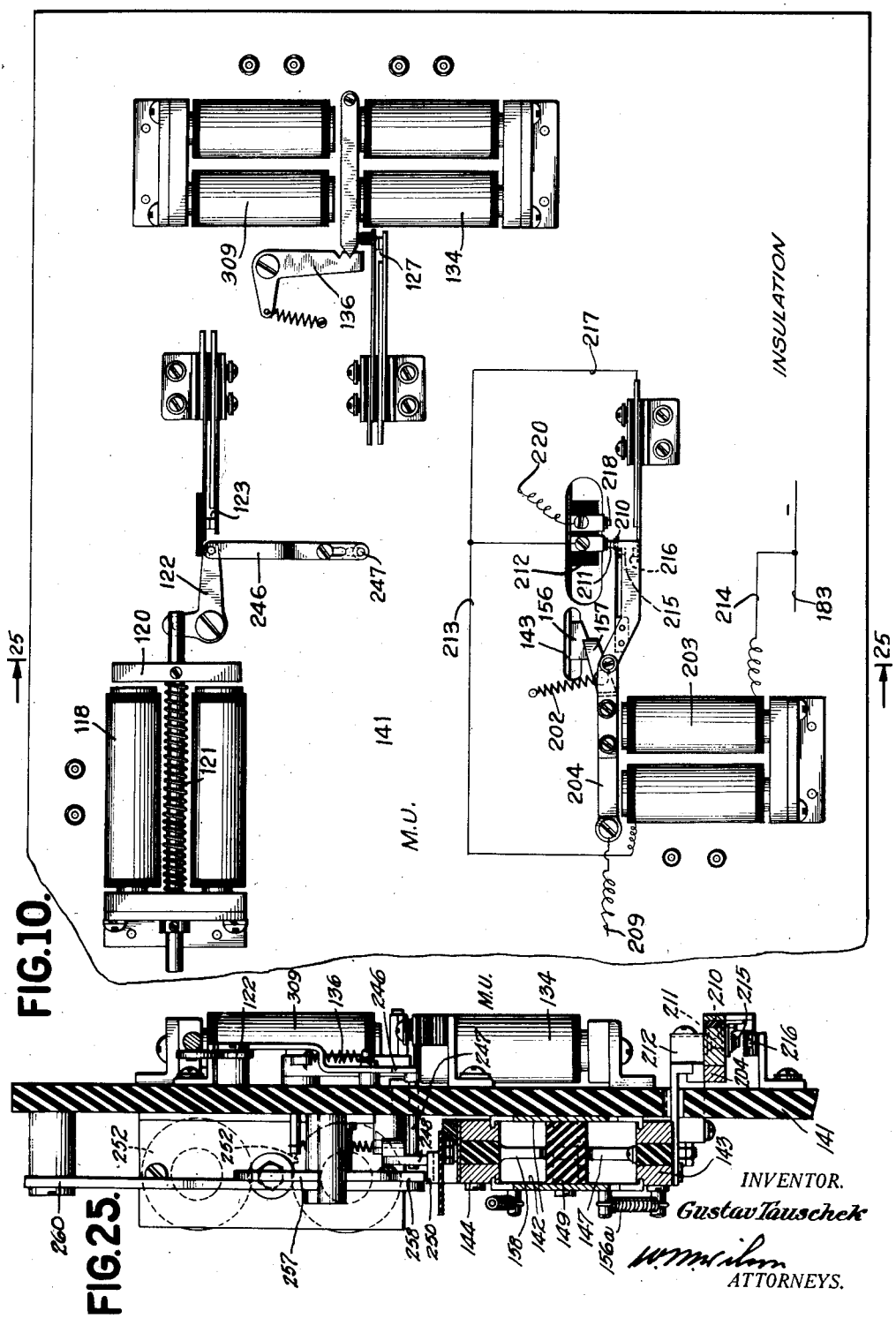

Dec. 5, 1939.　　　　　　G. TAUSCHEK　　　　　2,182,006
TABULATING MACHINE
Filed Dec. 19, 1934　　　15 Sheets-Sheet 11
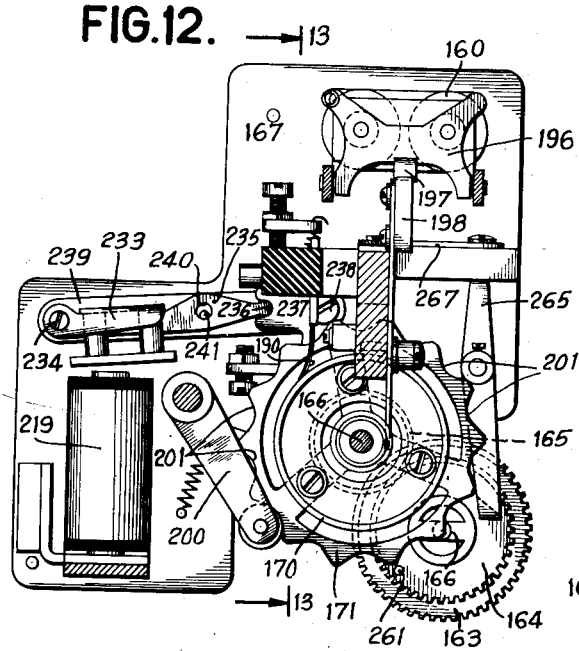

Dec. 5, 1939.  G. TAUSCHEK  2,182,006
TABULATING MACHINE
Filed Dec. 19, 1934  15 Sheets-Sheet 12

INVENTOR.
Gustav Tauschek
BY
ATTORNEYS.

Dec. 5, 1939. G. TAUSCHEK 2,182,006
TABULATING MACHINE
Filed Dec. 19, 1934 15 Sheets-Sheet 13

INVENTOR.
Gustav Tauschek
BY
ATTORNEYS.

Dec. 5, 1939.  G. TAUSCHEK  2,182,006
TABULATING MACHINE
Filed Dec. 19, 1934  15 Sheets-Sheet 14
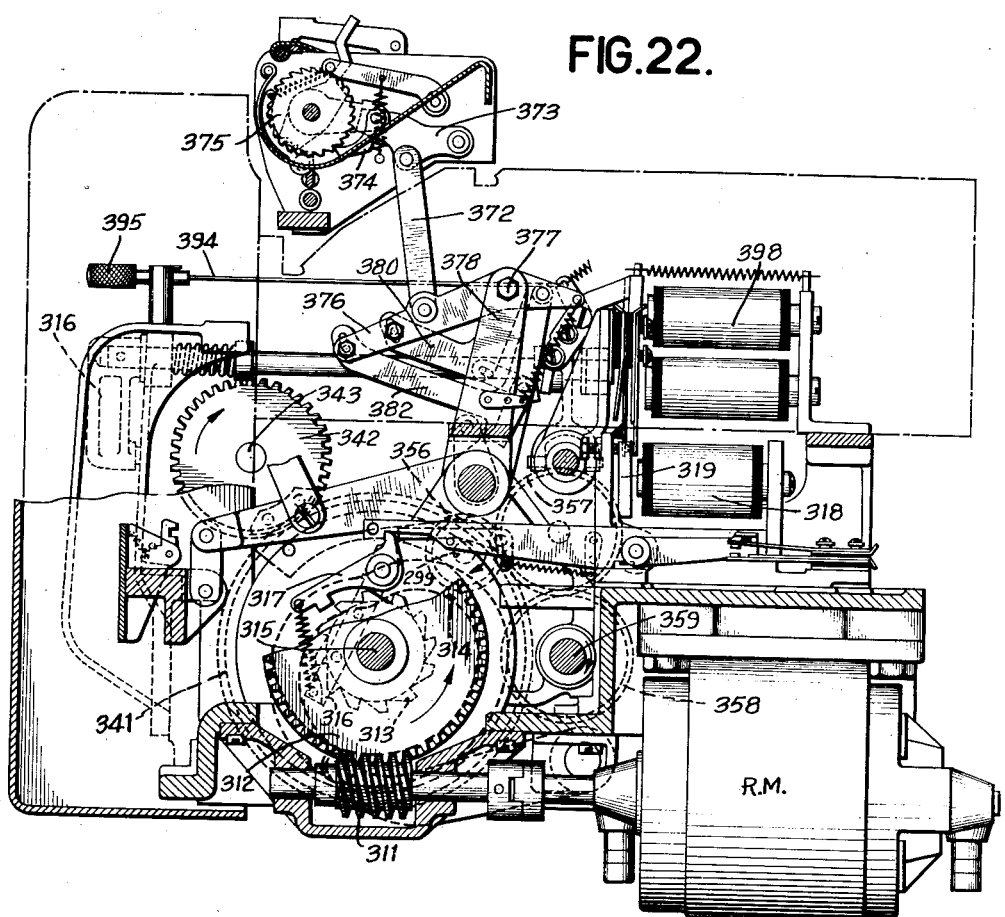

Dec. 5, 1939.  G. TAUSCHEK  2,182,006
TABULATING MACHINE
Filed Dec. 19, 1934  15 Sheets-Sheet 15

Patented Dec. 5, 1939

2,182,006

UNITED STATES PATENT OFFICE 2,182,006

TABULATING MACHINE

Gustav Tauschek, New York, N. Y., assignor to International Business Machines Corporation, New York, N. Y., a corporation of New York Application December 19, 1934, Serial No. 758,230

10 Claims. (Cl. 235—61.9)

The present invention is directed to improvements in tabulating machines and more particularly to improvements in a tabulating machine of a type which is well known and on the market whereby this machine may be employed for effecting either ordinary tabulating or statistical operations or multiplying operations under control of cards which are passed through the machine.

The present invention has for one of its objects the provision of means whereby the accumulators which are incorporated in the tabulating machine may be used selectively for normal statistical operations under control of fields of the tabulating card or may be used when the machine is conditioned for performing multiplying operations.

A still further object of the invention is to provide selective plug connections whereby the various printing banks of the tabulating machine to which the present improvements are applied may also be used to effect the printing of the multiplier, multiplicand and related product, all involving a single problem.

A still further object of the invention is to permit the use of certain of the accumulators to accumulate the value of the multiplier, multiplicand, and the products as they are formed in successive multiplying problems.

The object of accumulating products is obvious and requires no comment. Provisions are made to accumulate multiplier and multiplicand values to increase the flexibility of the machine so as to meet the varied requirements of accounting systems. In some forms of accounting, values of the same class may be perforated in the multiplier column of the card while in others they may be perforated in the multiplicand column of the card.

In addition to accomplishing the last named result, the related printing banks are adapted to print the totals of the accumulated multiplier, multiplicand and product amounts.

A further object of the present invention is to provide an improved form of multiplying mechanism preferably operating upon the principle of successive addition.

Among the many and variously improved mechanisms which will be apparent as the invention is understood, there is provided an improved form of multiplier digit setting up mechanism, and a cycle limiting device which is adapted to automatically call the product printing mechanism into operation to print the product forming the result of the multiplying problem.

A still further object of the machine is to provide an improved form of control of the card feeding mechanism whereby the card involved in the multiplying problem is adapted to remain at rest while the brushes are successively reciprocated to accomplish the multiplying operation.

The control of such card feed is also associated with the control of certain accumulators whereby they are adapted to receive the successive multiplicand amounts, disestablishing at this time the actuating connections to the accumulators adapted to accumulate the multiplier and multiplicand amounts. However, at the termination of the multiplying operation the feeding of the card is resumed and the multiplier and multiplicand accumulators are then operatively connected for control by the analyzing brushes so that upon a further feeding of the card the entry of the multiplier and multiplicand amounts will be performed.

A still further object of the machine is to arrange the driving mechanism for the tabulator whereby it operates at a high speed during multiplying operations and at a comparatively low speed when the printing attachment prints the multiplier and multiplicand amount. Such high speed operation of the tabulator is preceded by the automatic operation of the usual total and reset motor to cause the printing upon a record sheet of the product of the last multiplying problem.

In connection with the paper feeding attachment devised for the tabulator in which the present improvements are incorporated, it is a further object of the present invention to provide an improved control therefor. This control is so devised that paper feeding operations are suppressed during multiplying operations and until just before the product is printed at which time a single line spacing operation will be performed. At this time, the paper feeding operating device is latched or suppressed in operation so that it will not be operative during the following cycle in which the multiplier and multiplicand amount is printed. The net result, therefore, is that the product, multiplier and multiplicand amounts constituting a single problem are printed on a single line, and the printed results of successive problems are suitably line spaced from each other.

A further object of the present invention resides in the combination with the multiplying attachment of a product punching mechanism which is adapted to punch the result of the multiplying operation upon the same card representing the factors of this problem.

Incidental to the provision of the product punching mechanism, means is provided for effecting an operative connection between said punching mechanism and the accumulator selected for receiving the product of a single problem and which is then adapted to be automatically reset preparatory to the next problem. Such operative connections comprise flexible Bowden wires which permit lateral displacement of the punching mechanism to provide punching of the result at any desired field.

Other objects reside in the general simplification of the multiplying attachment among which may be noted the provision of an improved form of brush reciprocating device which is entirely mechanical in its movement to cause the brushes to be mechanically reciprocated over the card to be analyzed and mechanically elevated and depressed during a certain direction of movement of the reciprocation of the brushes.

The brush elevating mechanism is so connected to the driving attachment of the tabulator that the pressure upon the face of the card due to the inherent tension of the brush strands is relieved somewhat when the card is placed in motion for either ordinary tabulating operations, or at the termination of a multiplying operation.

Other objects and advantages will be pointed out in the accompanying specification and claims and shown in the accompanying drawings which show one and what is now considered to be a preferred form of embodiment of the invention.

The improvement is illustrated in detail in the accompanying drawings in which:

Fig. 1 and Fig 1a comprise sheets 1 and 2 which when taken together show an electro-mechanical wiring diagram of the tabulator and the improved attachment.

Fig. 2 is a front view of a tubulator embodying the improvements of the present application;

Fig. 3 is a view in side elevation of the left end of the tubulator and is taken on the line 3—3 of Fig. 2;

Fig. 4 is a view in side elevation and is taken on the line 4—4 of Fig. 2;

Fig. 10 is a front view in elevation disclosing some of the mechanism attached to one side of the central support plate of the multiplying unit;

Fig. 12 is a view in section illustrating the improved form of mechanism for causing the setting of the value of the multiplier digits;

Fig. 13 is a sectional view taken on the line 13—13 of Fig. 12;

Fig. 14 is a sectional view taken on the line 14—14 of Fig. 13;

Fig. 15 is a plan view and is taken on the line 15—15 of Fig. 13;

Fig. 16 is an enlarged sectional view taken on the line 16—16 of Fig. 13;

Fig. 22 is a detail sectional view showing particularly the reset motor, the associated clutch and the paper feeding mechanism;

Fig. 23 is an enlarged view in side elevation of a conventional form of paper feeding mechanism with a novel control thereof comprising a part of the present invention;

Fig. 24 is a plan view showing a detail of the present improvement in the paper feeding controlling mechanism;

Fig. 25 is a sectional view of the multiplying unit and is taken on the lines 25—25 of both Figs. 10 and 11.

Tabulator drive

Figure 1:
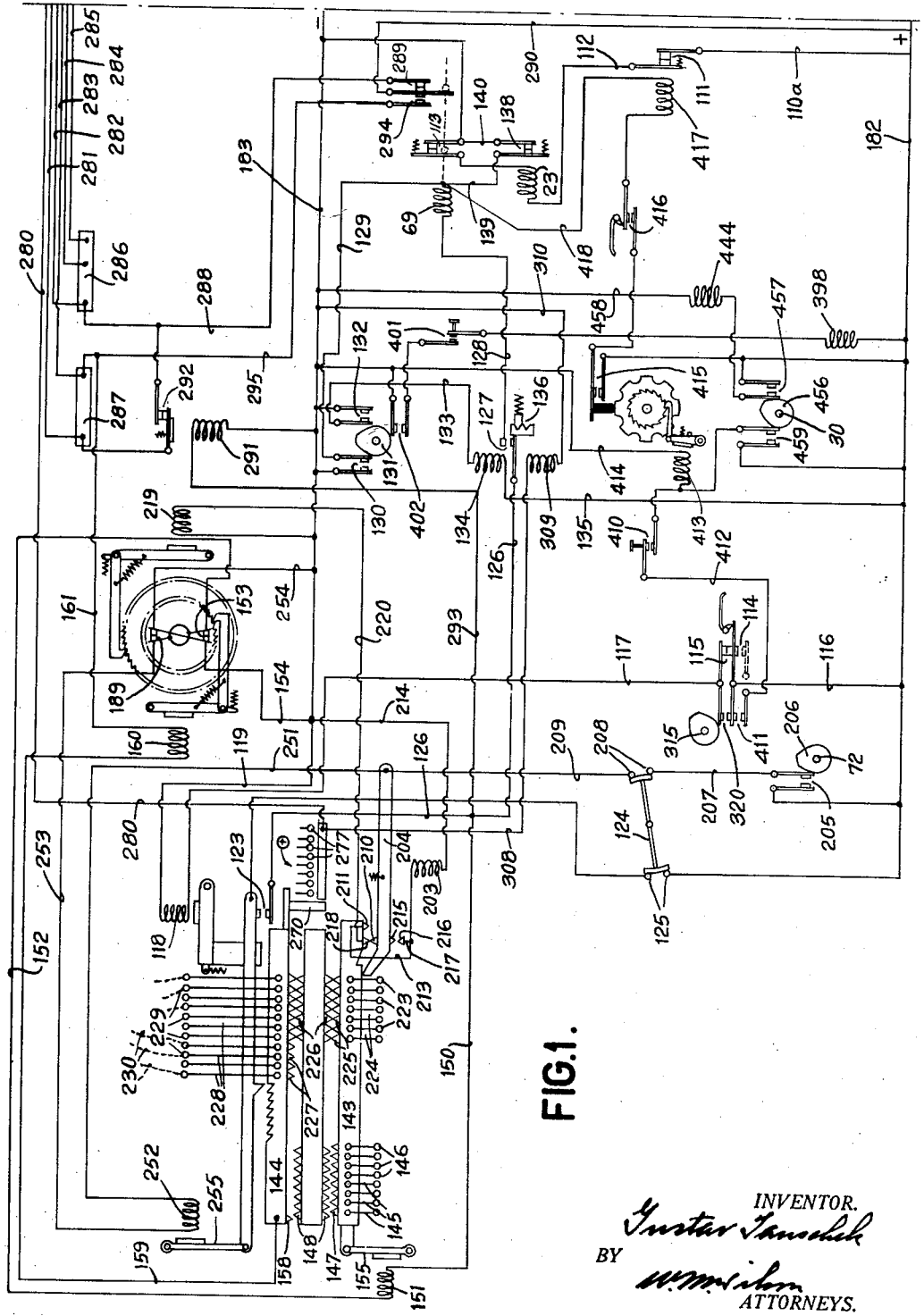

Current to the tabulator is supplied from a suitable source 181 (Fig. 1a) which supplies current to the positive line side 182 and the negative line side 183. The tabulating motor TM is of the same type as explained in the patent to Daly et al. No. 1,762,145 in that it has two speeds.

When the machine is set by a non-list lever 316 to tabulating position it runs at a low speed because in the first cycle of operation after the product is printed the multiplicand and multiplier amounts are printed, and for cycles of operation in which multiplying is effected the machine runs at a higher speed.

In order to start the tabulating motor the start key, designated "Start key" is depressed so that a starting circuit will be established. This circuit is from the positive line side 182, through the motor TM, tabulator clutch magnet 55, motor relay magnet 185, the start key contacts ST, contacts 86a of the motor control relay 186, "stop key" contacts 187, and the cam contacts P—3 to the negative line side 183. Energization of motor relay magnet 185 causes it to set up a holding circuit around the start key through the cam contacts L—3 and P—3 when the machine is tabulating only, or through the contacts L—4, L—13, and P—3 when the machine is set for listing.

The above operation has started the tabulator motor TM, energized the clutch magnet 55, and engaged a one revolution clutch 184 (see Fig. 3) thereby starting cards feeding through the machine. As soon as the forward card lever contacts 63 have closed another holding circuit is established around the start key contacts. The card lever contacts 63 maintain the operation of the tabulator provided relay 186 which controls contacts 86a remains de-energized. If either 86a, 63, or 187 are opened the tabulator will be stopped at the end of the cycle.

As will be hereinafter explained at the completion of a multiplying operation the motor control magnet 186 is energized which causes contacts 86a to open to stop the motor TM. Thereupon the reset motor RM is automatically set into operation to accomplish the printing of the product and other functions to be hereinafter explained.

The tabulating motor TM (Fig. 2) by a belt 10 drives a pulley 11 to which there is secured a ratchet wheel 12 (Fig. 3) of the clutch 184. The ratchet wheel 12 is loosely mounted on shaft 13 and is in continuous rotation as long as the TM motor is in operation.

The clutch 184 is of the usual type and comprises a pawl 14 normally held out of engagement with the ratchet wheel 12 by an extension of the armature 15 of clutch magnet 55. As is well known when the magnet 55 is energized the armature 15 is attracted so that a spring 16 will engage the pawl 14 with the ratchet wheel 12 and thereby turn a bar 17 on which the pawl 14 is pivotally mounted. Since bar 17 is secured to the shaft 13 a full revolution of the latter will be effected. If magnet 55 is energized prior to or at the time that a full revolution of shaft 13 is effected a second revolution will commence and carry through. For further details of operation and construction of the clutch 184 reference to the Lake Patent No. 1,822,594 dated September 8, 1931 should be made.

Card feeding mechanism

Figure 6:
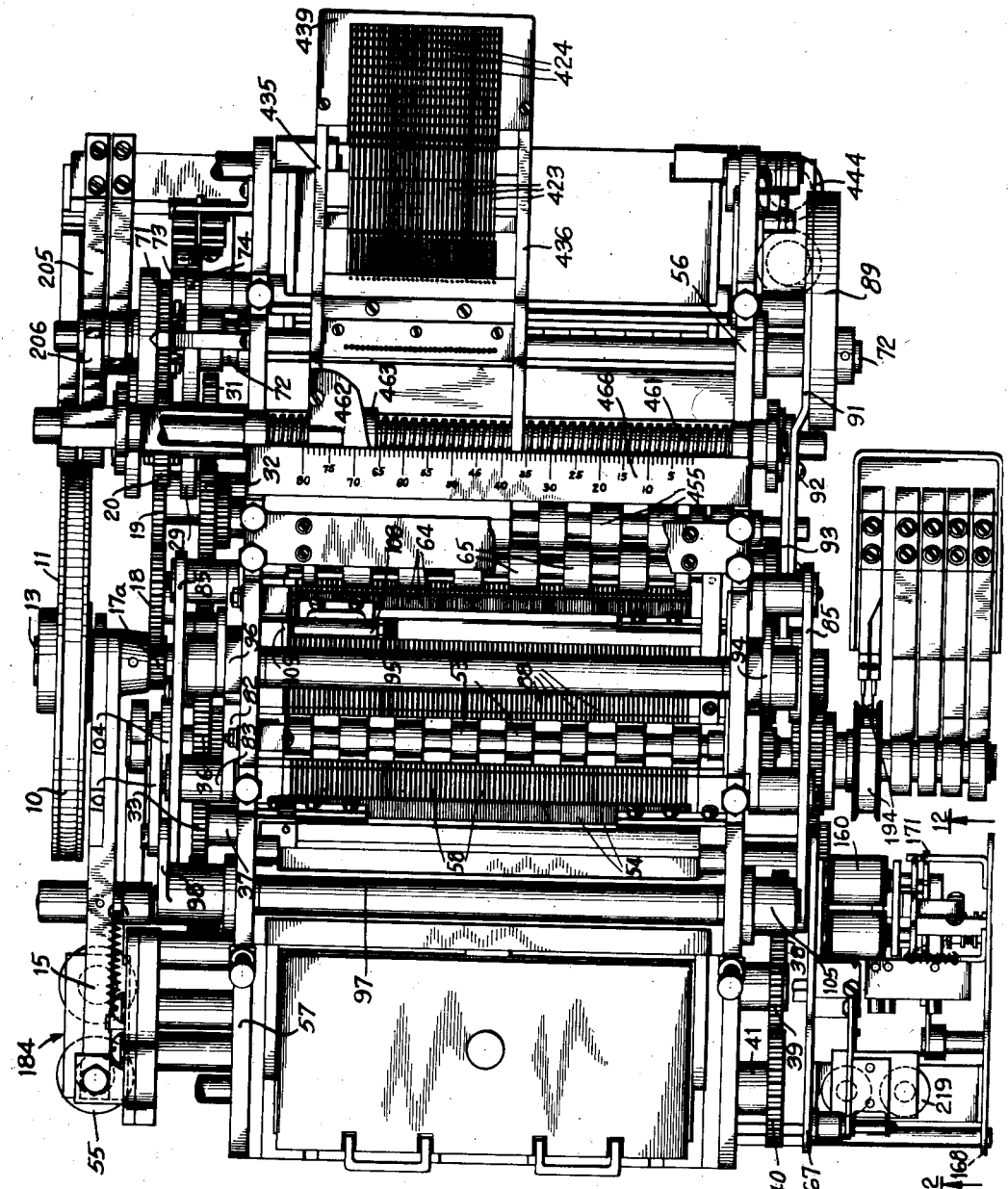
Fig. 6 is a plan view of the attachment comprising part of the present improvements.

To the shaft 13 there is secured a pinion 17a which through gears 18, 19 and 20 drives a clutch element 21 (Fig. 8) of the card feed clutch 22 because the clutch element 21 is attached to the gear 20 (see Fig. 6).

The operation of the card feed clutch 22 is controlled by a magnet 23 which is energized at the proper time to attract an armature 24 and by a hooked portion 25 thereof unlatch a clutch pawl 26 so that the latter by a spring 27 engages a notch 28 of the clutch element 21. The pawl 26 is pivoted upon a disk 29 loosely mounted on a shaft 30. Attached to the disk 29 is a gear 31 (see Fig. 6). After a full revolution of the gear 31 the hooked portion 26 will re-engage the tail 31 of the pawl 26 to relatch the latter. This type of clutch is also of a conventional structure and for this reason is briefly explained herein.

There will now be described the driving mechanism from the gear 31 to the card feeding mechanism. As is best shown in Fig. 6 meshing with the gear 31 is a gear 32 (see also Fig. 3) which drives a gear 33 by a train of gears 34, 35, and 36. The gear 33 is secured to a shaft 37 which passes through the machine frames and which has at one of its ends a gear 38 (Fig. 4) secured thereto. By means of a train of gears 39 and 40 a card feed shaft 41 is driven.

Figure 5:
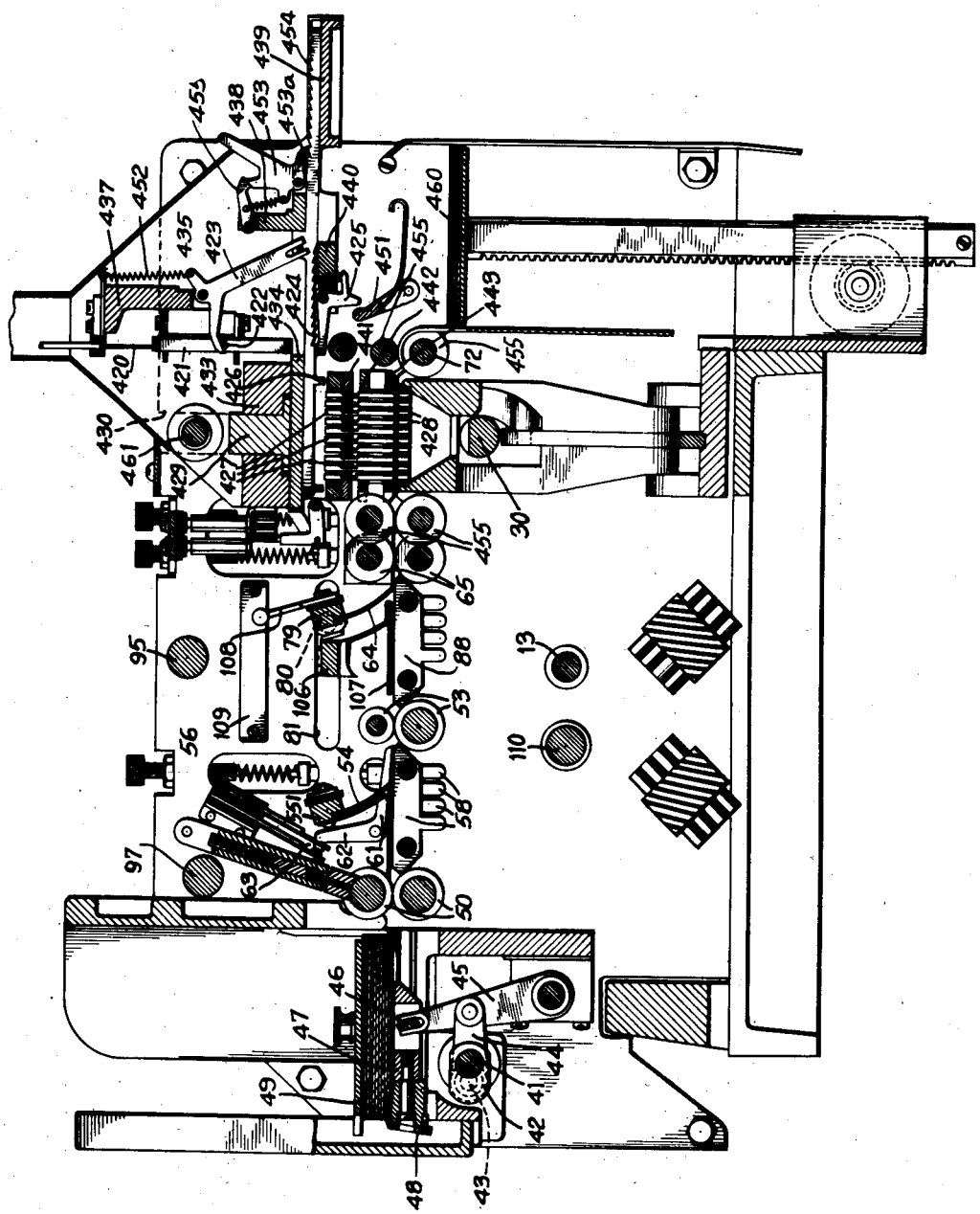
Fig. 5 is a central sectional view of the attachment comprising part of the present improvement and is taken on the line 5—5 of Fig. 2.

Referring now to Fig. 5 the shaft 41 has secured thereto a crank arm 42 to which is pivoted at 43 a link 44. The latter is secured to an oscillatable arm 45 having a fork connection 46 to a reciprocating frame 47 carrying a picker 48. For each revolution of shaft 41 effective during a card feeding cycle the picker 47 feeds a tabulating card from a supply of tabulating cards 49 to the first pair of feeding rollers 50. These rollers are intergeared at one end by gears 51 (Fig. 3) and at the other by gears 52 (Fig. 4) and since one gear of each set is attached to shaft 37 an opposite rotation of the feeding rollers 50 will be effected.

The leading edge of the card as it is fed encounters a pair of feeding rollers 53 (Fig. 5) which are intergeared in order to feed the card for opposite rotation in the manner just explained and are driven by the gear 35 (Fig. 3).

Forward analyzing brushes

As the card passes to the feeding rollers 53 the perforations therein are analyzed by the forward brushes 54 (Fig. 5) which correspond to the upper or control brushes of the machine disclosed in the last patent mentioned. In the present instance brushes 54 are carried by a metallic rod 55I extending between but insulated from the side frames 56, 57. The flexible wire brushes 54 bear upon track portions 58 which there is one for each card column and each insulated from the other. The brush control circuit through a perforation analyzed while the card is in motion is made by the brush strands that pass through the hole and contact with a track portion 58. The latter as shown in Fig. 1 are connected to plug sockets 59 which can be plugged, as desired, to the magnets 60 of the automatic control unit when the use of such unit is desired. The construction and use of such unit is so well known that further description is unnecessary. For further details reference should be had to the patent to C. D. Lake, 1,379,268, dated May 24, 1921, and No. 1,600,413, dated September 21, 1926.

When the card is beneath the forward brushes 54 a card lever comprising an arm 61 is rocked by the card and an integral contact arm 62 closes the contacts 63. As previously stated this will maintain the operation of the tabulating motor TM after the first cycle. The card is then fed rearwardly to be analyzed by the rearward analyzing brushes 64.

Rearward analyzing brushes

The analyzing brushes 64 are stationary in tabulating or statistical operations usually involving a single card factor for each accumulator but when the machine is conditioned for effecting multiplication the brushes 64 are reciprocated, repeatedly, until the complete product has been derived. The preferred means for reciprocating brushes 64 will now be described.

As will be explained in connection with the wiring diagram when the card is in its proper position for analyzing the card by brushes 64 the movement of the card is stopped. When the card emerges from the rollers 53 (Fig. 5) it is fed to rollers 65 which are driven in the manner shown in Fig. 4. A pinion 66 attached to the lower feed roller of the set 53 drives an intermediate gear 67 which in turn drives the intermeshed gears 68 of the feed rollers 65. When the card is between rollers 53 and 65 the driving of these rollers is stopped as will be explained and at this time a magnet 69 (Fig. 9) is energized. Referring now to Fig. 3, the gear 20 drives a gear 70 which in turn drives a gear 71 loosely mounted on a shaft 72. To the gear 71 there is secured a clutch element 73. To the shaft 72 there is secured a companion clutch element 74 carrying a clutch pawl 75. When the armature of the magnet 69 is attracted the hooked arm 76 will release the pawl 75 so that its spring 77 will cause it to enter the notch 78 of the clutch element 73. Thereupon shaft 72 will be driven for a complete revolution.

Figure 7:
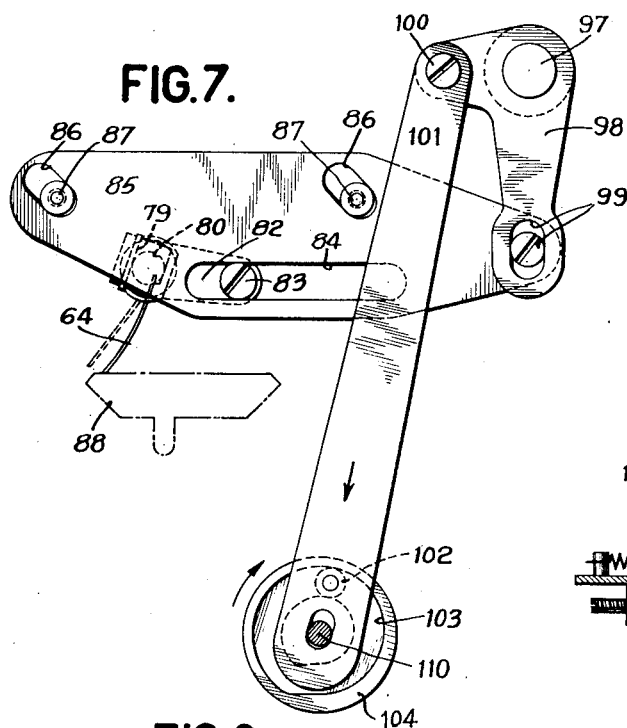
Fig. 7 is a detail view of the preferred form of mechanism for elevating the analyzing brushes when the machine is employed either to perform multiplying operations or tabulating operations.

Referring now to Figs. 3, 5 and 7 it will be seen that a square bar 79 carries the brushes 64 and said bar is provided at its ends with circular portions 80 engaging closed slots 81 in the side frames 56 and 57. The brush strands are normally flexed and this condition is secured by providing the ends of the bar 79 with arms 82 (see Figs. 4 and 7) which carry studs 83 fitting in closed slots 84 of plates 85. Each of said plates 85 is mounted on its respective side frame 56, 57 by inclined slots 86 in which fit studs 87 carried by the side frames. In the process of assembly before the stud 83 can be passed through the slot 84 to be screwed in the threaded hole of arm 82, the arm 82 must be rocked manually counterclockwise and as the brushes 64 now rest on the tracks 88 the brushes will be bent as shown in Fig. 7. This will provide for the initial bending of the brushes 64. The brushes 64 normally (Fig. 5) pass over the card and pass through perforations therein to engage tracks 88. There is one track 88 for each card column.

One end of shaft 72 (see Fig. 4) carries a box cam 89 in which cam portion fits a roller 90 of a slidably mounted plate 91. Said plate is connected by pin and slot connections 92 to a plate 93 apertured to receive one of the studs 80. The connection 92 is merely for adjustment purposes and plates 91 and 93 may be considered as a single member. The cam race of box cam 89 is so designed that it will effect a reciprocation of the brushes 64 over the card. The circular stud 80 at one end of bar 79 receives a slot of an arm 94 secured to shaft 95. This shaft, at its other end (see Fig. 3) has connected thereto a similar arm 96 receiving the other stud 80 near the side frame 57. This will insure the simultaneous movement of the bar 79 at both ends, the later, obviously being guided by the guide slots 81 in side frames 56 and 57 and the guide slots 84 of the plates 85.

When the brushes 64 have passed over all the area receiving perforations the brushes are elevated slightly, as shown by dotted lines in Fig. 7. This is performed just before the time the brushes are to return so as to prevent the brush strands from being bent by the card perforations. To accomplish this there is secured to a shaft 97 carried by the side frames 56 and 57 a bell crank 98 one arm having a pin and slot connection 99 to one of the plates 85 and the other arm being connected at 100 to a pitman 101. The latter has a roller 102 engaging the race 103 of a box cam 104. At the extreme forward movement of brushes 64 the cam race will depress pitman 101, rocking the bell crank and shift plate 85 downwardly guided by inclined slots 86 and pins 87. This will rock the bar 79 clockwise, lifting the brushes 64 off the card. When this is done cam 89 (Fig. 4) will restore the brushes 64 free of the card. When at their normal position the brushes are lowered for engagement with the card, as shown in Fig. 5. While bell crank 98 shifts only one plate 85 the other plate 85 is shifted by an arm 105 (see Fig. 4) connected to the shaft 97 and having at its free end a pin and slot connection to the plate 85 adjacent the side frame 56.

The bar 79 has secured thereto a plate 106 (Fig. 5) carrying a series of bent guide fingers 107 which pass to the left in the spaces between the rollers 53, since the latter are spaced as shown in Fig. 6. Such plates keep the card smooth while the brushes press upon its surface. Brushes 64 are electrically connected together and may be considered as a single brush. To retain electrical connection thereto during the reciprocation of the brushes 64 the latter are electrically connected to a spring pressed contact member 108 which is in continuous frictional contact with a contact plate 109.

In order to rotate the cam 104 the latter is fixed to a shaft 110 (Fig. 7) which, as is shown in Fig. 4, has a gear 111a secured thereto at one of its ends. The gear 111a meshes with a pinion 112a attached to the shaft 13. It is pointed out that ordinary calculating operations such as addition, the shaft 13 turns for each card tabulating operation during which operation the card is analyzed in motion. While cam 104 lifts the brushes 64 it does so only after all the card perforations have been analyzed when the card is analyzed in motion. This relieves the pressure on the face of the card and the latter is fed more easily than if the pressure was maintained. It is also explained that when a multiplying operation has been completed the card is again analyzed while it is in motion, and after the analyzing operation the brushes 64 are elevated with the same advantage as has been explained.

*Electrical features*

Referring to the wiring diagram it will be seen that when the source of current 181 is connected to the line sides 182 and 183 a circuit described as followed is closed. A wire 110a, contacts 111 now closed, wire 112, card feed clutch magnet 23 to contacts 113 (see Fig. 9) now closed, to the negative line side. As magnet 23 is now energized and the start key depressed a card will be fed and ultimately arrive beneath the brushes 64. When the card is in its proper position with respect to brushes 64 a card lever adjacent brushes 64 will be operated to open contacts 115 and close contacts 114. The following circuit will then be opened. Positive line side 182, wire 116, contacts 115, wire 117, magnet 118, and by wire 119 to the negative line side 183. Magnet 118 is shown in Fig. 10 and shows the position of its armature 120 when the magnet is deenergized. In this case its spring 121 will rock a bell crank 122 to cause contacts 123 to close.

Figure 8:
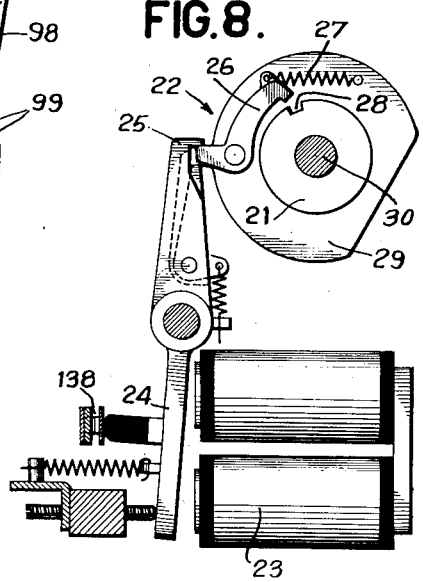
Fig. 8 is a detail view of the card feeding control clutch.
Figure 9:
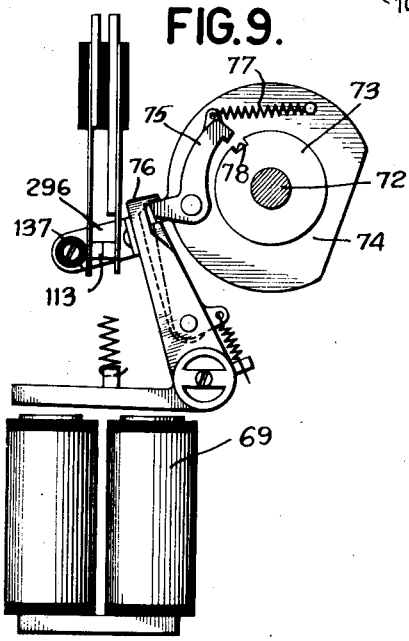
Fig. 9 is a detail view in side elevation and discloses the preferred form of clutch for causing reciprocation of the analyzing brushes.

Still referring now to the wiring diagram when multiplication is to be effected a multiplier control switch 124 is set to bridge contact points 125 thereby partially closing a circuit described as follows: Positive line side 182, contact points 125 closed, contacts 123 now closed, wire 126, and thence to contacts 127 now open, wire 128, magnet 69, wire 129, cam controlled contacts 130 to the negative line side 183. During the cycle in which the card is fed beneath brushes 64 contacts 130 are closed by a related cam 131 but before this occurs the same cam 131 closed contacts 132. A circuit, from the negative line side 183 through such closed contacts 132, a wire 133, magnet 134 and wire 135 to the positive line side 182, is thereby completed. Magnet 134 is also shown in Fig. 10 where it will be seen that when its armature is attracted it will cause the contacts 127 to close and remain closed since the armature is impositively held by a detent device 136. Now when contacts 130 close magnet 69 is energized. As is best shown in Fig. 9 when this occurs its hooked arm 76 will shift an arm 296 and roller 137 carried thereby to permit the the left contact blade of contacts 113 to be shifted by its own resiliency to open contacts 113. The circuit to the card feed clutch magnet 23 is now opened and card feed stops at the end of the cycle. Since magnet 69 is now energized the brushes 64 will be reciprocated and contine to reciprocate as many times as is necessary to accomplish multiplying operations. A stick circuit to retain magnet 69 continually energized is described as follows: Fig. 8 shows magnet 23 deenergized whereupon contacts 138 are closed. From magnet 69 a wire 139 (see wiring diagram) extends through such contacts 138 and wire 140 to the negative line side. This provides a stick circuit for magnet 69 as long as contacts 138 remain closed.

It is pointed out that actually contacts 132 are closed by cam 131 during the first cycle when the card is beneath the brushes 64 and contacts 138 also close during this cycle with no effect on magnet 69, even though contacts 127 close. During the second cycle when contacts 123 close and then contacts 138 close the magnet 69 is energized. This timing provides for the reciprocation of the brushes only when the card is beneath brushes 64.

Multiplying unit

The multiplying unit M. U. (see Figs. 10, 11 and 25) is located at the bottom of the machine (see Fig. 2) and includes a central support plate 141. Slidably mounted by a pair of plates 142 carried by the plate 141 is a lower slidable switch bar 143 and an upper slidable switch bar 144. The left end of the lower bar 143 (Fig. 11) carries eight terminals which have flexible wire connections 145 to sockets 146 (see also Fig. 2). Said terminals carry eight switch fingers 147 normally out of contact with the contact points 148 of the intermediate stationary switch bar 149.

Referring to the wiring diagram when contacts 123 close the positive line side 182 will be connected through contacts 123 and a wire 150 to a magnet 151. The magnet 151 is connected to the negative line side by a wire 152, contacts 153, now closed and a wire 154. When magnet 151 (see Fig. 11) is energized its armature rocks an arm 155 which shifts the bar 143 against the action of a spring 156a. The bar 143 has a lug 156 (see Fig. 10) the diagonal notch of which is received by a spring urged latch element 157 when bar 143 is shifted to thus hold bar 143 in its shifted position and until the cycle of operation in which the multiplier digit is sensed is completed.

Figure 11:
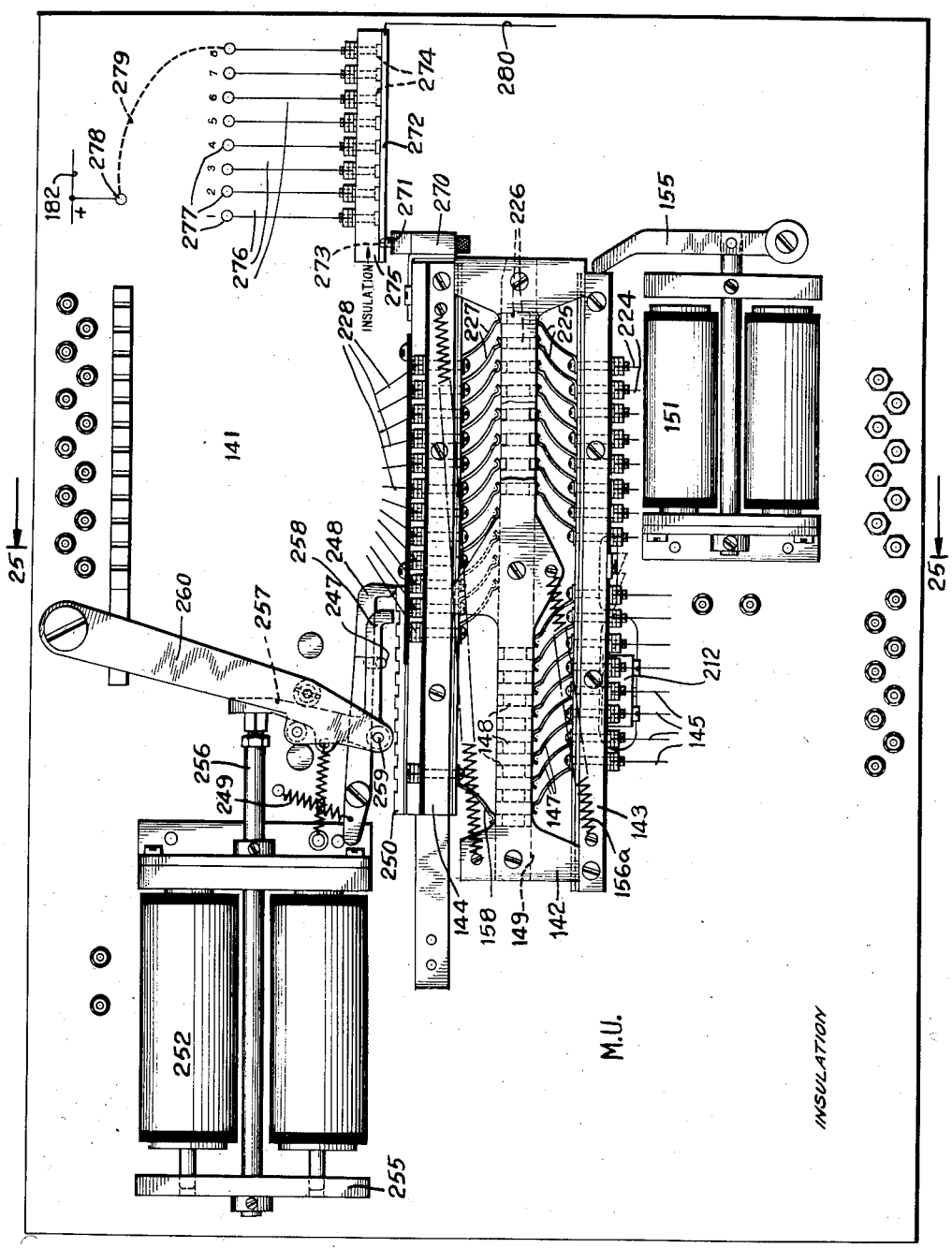
Fig. 11 is a front view in elevation showing the mechanism carried by the other side of the central support plate of the multiplying unit.

Referring to Fig. 11 when the bar 143 is shifted to the left one step the left contact finger 147 will contact with the left contact point 148. The bar 144 is now in the position shown where its contact finger 158 contacts with the left end contact point 148. The wire connections 145 are plug connected to plug sockets 146 as previously stated. The latter are connected by plug connections to the track portions 88 correlated with the multiplier factor representing perforations in such manner that a step-by-step position of bar 144 will cause finger 158 to be electrically connected successively for control by the multiplier card columns. Contact finger 158 is connected by a wire 159 (see wiring diagram) to a magnet 160 which is connected to the positive line side by a wire 161, wire 295, contacts 294 now closed, and wire 290.

(a) Multiplier digit set-up

To set up the multiplier digits the following mechanism is preferably employed. As best shown in Fig. 4 gear 111a drives a gear 163, and to the latter there is secured a gear 164 driving a pinion 165 attached to a shaft 166.

The multiplier digit representing mechanism is carried by a frame structure including parallel slide frames 167 and 168 (see Figs. 12-14) and the shaft 166 is supported by both of said frames. To shaft 166 there is splined a clutch element 168. The companion clutch element 169 is loose upon shaft 166 and to the clutch element 169 there is secured a collector ring 170 and a dentated wheel 171. The wheel 171 carries a laterally extending plate 172 (Fig. 16) to which is riveted a plate 173 sufficiently resilient and so bent that its straight edge 174 bears against a rod 175 of insulating material carried by wheel 171.

A sleeve 176 (Fig. 13) is loosely mounted on the shaft 166 and said sleeve carries a ratchet wheel 177 and two collector rings 178 and 179. The collector ring 179 carries two plates 180 and 188 (Fig. 16). The plate 180 carries a contact point and the plate 173 a related contact to form the contact points 153. The plate 188 carries a contact point which with a related contact point of plate 173 forms other contact points 189. A brush 190 bearing against the collector ring 170 has the common wire connection 154 (see wiring diagram) to the negative line side 183. A brush 191 bears on the collector ring 178 which has an electrical connection to plate 180. A brush 192 bears on the collector ring 179 which has an electrical connection to plate 188. Normally, that is, before a multiplier digit is set up, the sets of contacts 153 and 189 are in contiguous relationship and they are separated as many units as corresponds to the digital value of a multiplier digit.

When the brushes 64 are reciprocated the controlling column representing the multiplier digit will be analyzed for the presence of a perforation. This will determine the time in the cycle the magnet 160 will be energized. The plug sockets 146 are connected by plug connections to sockets 193 (Fig. 1a) connected to the tracks 88 of the multiplier digit card representing columns related to counter #2 in such a manner that the units order column controls first, then the tens order, and so on. The brushes 64 are electrically connected through the impulse distributor 194 (see also Fig. 6) to a binder post 195 which corresponds to the binder post 11 of the disclosure in the Patent No. 1,762,145 and which is connected through certain contacts to one side of the line as is fully described in the patent.

This circuit in the present instance leads to the same line side which is the negative line side 183. When the brush locates a perforation magnet 160 is energized by means of such circuit. When energized its pivoted armature 196 (Fig. 13) is attracted to elevate a hook 197 thereof from a notch in a lever 198. The lower end of the lever 198 engages a collar of the clutch element 168 which clutch element upon energization of magnet 160 is shifted by a spring 199 to engage the clutch element 169. The shaft 166 now turns clutch element 169 and turns it synchronously with the movement of the analyzing brushes 64 over the card. If the perforation is at the six position, with the 9 index point leading as is customary, the contacts of the spring 174 will be turned at the third point in the cycle and until the "0" index point position is analyzed. Contacts 153 and 189 are now separated a distance of six steps, in the example assumed. A roller of a spring pressed arm 200 (Fig. 12) engaging the scalloped notches 201 of the wheel 171 will impositively hold the contacts in their adjusted positions.

The preferred form of mechanism for causing clutch elements 168-169 to be disengaged when the "0" index point position is reached is best shown in Figs. 12 and 15. Attached to the gear 164 is a pin 261 adapted at the "0" index point position to engage with and rock a bell crank 265. The upper end of the bell crank 265 carries a pin 266 fitting in a hole provided in one arm of a second bell crank 267. The latter has a socket connection to a slidable plate 268 provided with a notch 269 in which the lever 198 fits. Through the train of mechanical connections just described, the shifting of the plate 269 will shift lever 198 so as to separate the clutch elements 168-169 and such relationship will again be held by the latching hook 197.

It is pointed out that as soon as contacts 153 open magnet 151 (see Fig. 11) will be de-energized but bar 143 will still be held in shifted position by the latch element 157 (see Fig. 10). A spring 202 urges the latch element 157 upwardly so as to hold the bar 143 in shifted position until the energization of a magnet 203, which occurs at the end of the cycle in which the digital value of the multiplier has been set up in the machine.

The circuit for the magnet 203 (see Fig. 1) which causes energization of magnet 203 and lowering of its armature 204 with the attached latch element 157 is traced as follows: From the positive line side 182, through contacts 205 controlled by a cam 206 rotatable by the shaft 72 which causes the brush reciprocation and closure of contacts 205 at the end of the cycle to thereby extend the circuit by a wire 207 to and through contact points 208 now closed since switch blade 124 has been shifted, the circuit then extending by wire 209 which is electrically connected to the armature 204 of magnet 203. Since the bar 143 is in shifted position during the multiplier digit analyzing operations the upper contact point 210 (see also Fig. 10) is now in contact with a contact point 211 carried by a bar 212 of insulating material which is carried by the bar 143. The circuit will then extend through contacts 210 and 211 and by means of a wire 213 to one side of the magnet 203, the other side being connected by a terminal wire 214 to the negative line side 183. Magnet 203 will, therefore, by its energization cause armature 204 to be moved downwardly disengaging the latch element 157 from the notch of plate 156 so as to release bar 143 and permit spring 156a (Fig. 11) to return it to normal.

Referring to Fig. 10 it will be noted that when the magnet 203 is energized the lower contact point 215 will engage a contact point 216 which is electrically connected by a wire 217 to the wire 213. Closure of contacts 215 and 216 will continue the energization of magnet 203 retaining magnet 203 energized to prevent contact 210 from engaging a contact 218 which would establish a circuit connection to a magnet 219 (see Fig. 1) by a wire 220 and which is only to be made in multiplicand analyzing operations. Thus magnet 203 is energized until cam controlled contacts 205 open.

(b) *Multiplicand entry*

The next operation of the machine requires repeated analyzing operations of the multiplicand factor corresponding in number to the digital value of the multiplier.

It has been assumed that the digital value of the units denomination of the multiplier was "6" and therefore six entries of the multiplicand will be effected by means now to be described. Certain of the card columns of the same tabulating card on which the multiplier is designated are appropriated for the representation of the multiplicand. The perforations designating the multiplicand will be analyzed by the brushes 64 as they are reciprocated thereby connecting, as stated, the negative line side to the tracks 88 related to the columns in which perforations are located. The tracks 88 related to the multiplicand factor are connected to plug sockets 221 (Fig. 1) and plug connections 22 are made from such to plug sockets 223 (Fig. 2). The latter have wire connections 224 (Fig. 1) to contact fingers 225 (Fig. 11) carried by the lower bar 143. The latter through contact points 226 of the bar 149 are in electrical contact with fingers 227 carried by the upper movable bar 144.

All of the contact fingers 227 are connected by wire connections 228 to the product sockets 229 (see Fig. 2). The latter have plug connections 230 (Fig. 1a) to the first and third product receiving accumulators and related printing banks 231 and 232 (Fig. 2).

The accumulators and printing banks are shown in general in Fig. 2 and their construction and operation are well known in this art. For further details, reference to the Patent No. 1,762,145 dated June 10, 1930, should be made. It will be sufficient to state here that no printing is effected during multiplying operations but the value of the multiplicand is accumulated by both of such accumulators, by the electrical connections described, one or more times according to the digital value of the multiplier digit. After the necessary number of additions, a change in denominational relationship between the controlling card columns and the elements of the accumulator is effected, as is well known to be necessary.

It should be noted from Fig. 11 that when the bar 143 is shifted to set up the multiplier digit the fingers 225 are disengaged from the contact points 226 so that no entries are made in the multiplicand accumulators during this operation. When the bar 143 is in the position shown in Fig. 11 multiplicand entries are effected.

Referring to the wiring diagram and Fig. 1C, it is apparent that when multiplicand entries are being made that contact points 210 and 218 are in engagement. Therefore, a current impulse under control of contacts 205 will be transmitted by the wire 220 to the magnet 219.

As is best shown in Figs. 12 and 14, when the magnet 219 is energized, its armature 233 will be attracted downwardly. The armature 233 is pivoted by a stud at 234 and has an integral extending arm 235 which has a socket connection 236 to one arm of a bell crank operating pawl 237. The pawl 237 is pivoted by means of a stud 238 on an arm 239 also pivoted on the stud 234. The arm 235 is provided with a hole 240 in which fits a pin 241 carried by the arm 239 and which pin is smaller than the hole 240. Obviously, when the armature 233 is attracted downwardly, the socket connection 236 will first rock the pawl 237 in a counterclockwise direction thereby bringing the lower operating finger 242 of said pawl into engagement with one of the teeth of the ratchet wheel 177 secured to the sleeve 176. When such engagement is effected, the top wall of the hole 240 will now strike the upper periphery of the pin 241 thereby causing by such pin and hole connection the rocking of the arm 239 so that its free end moves downwardly and thereby depresses pawl 237 to rotate the ratchet wheel 177 a single step of movement. Upon the deenergization of the magnet 219, a spring 244 will cause a reverse action of the parts to bring the operating finger 242 of the pawl 237 so as to be normally free of the tooth of the ratchet wheel 177. This particular type of pawl and operating connection therefor, is briefly explained herein as it is fully described in the prior patent to Gustav Tauschek, No. 1,781,349 dated November 11, 1930, to which reference should be made for further details of construction and operation.

It is pointed out that when the ratchet wheel 177 is turned a step of movement by the mechanism just described, its position of movement is retained by means of the usual retrograde preventing pawl 245. It is also clear that for each step of movement of the ratchet wheel the sets of contacts 153 and 189 are brought together by successive steps of movement. Therefore, for each entry of the multiplicand, the ratchet wheel 177 will be turned in the same direction that the wheel 171 was previously turned and which at this time is stationary while the ratchet wheel 177 is being moved step-by-step.

The number of multiplicand operations required to effect the engagement of contacts 153 and 189 is obviously dependent upon the number of steps of operation that were previously employed to effect the desired separation of the related sets of contacts, which in the example assumed, comprises six operations. When the contacts 153 ultimately engage each other, it will be apparent from the wiring diagram that there will be a circuit connection made from the negative line side 183, wire 154, contacts 153 now closed, wire 152 to the magnet 151 which is, by the circuit previously described, connected to the positive line side 182.

Energization of the magnet 151 will cause the bar 143 to be shifted so that all of the contact fingers 147 are in reengagement with the contact terminals 148.

(c) Denominational column shift

It is essential, however, that after the multiplying operations under control of a denomination of the multiplier have been completed by the process of repeated addition that the ordinal relationship between the controlling card columns representing the multiplicand and the denominations of the accumulating wheels be changed. Such change in relationship in the present machine is effected by causing the bar 144 to be shifted to the right a step of movement.

It will be recalled that when the machine is set for a multiplying operation that the magnet 118 is deenergized (see Fig. 10). The bell crank 122 when rocked in a clockwise direction as a result of the deenergization of magnet 118, will cause the lowering of a plate 246. To the lower end of the plate 246 there is attached a pin 247 (see now Fig. 11) which projects through the support plate 141 so that it underlies the lower edge of a retrograde preventing pawl 248. Therefore, at the initial operation of the machine, the retrograde preventing pawl 248 will be rocked by a spring 249 so as to rest upon the top surface of a notched bar 250 carried by the bar 144.

Referring to the wiring diagram, it will be apparent that during the last multiplicand operation when contacts 205 close an impulse will be directed by wire 207, contact points 208, wire 209 to a wire 251. The wire 251 is connected to one side of a magnet 252 and the other side of the magnet is connected by a wire 253, contacts 189 now closed, and a wire 254, to the negative line side 183.

Energization of the magnet 252 attracts an armature 255 (Fig. 11) and by means of a rod 256 rocks a bell crank 257 to cause a horizontal arm 258 of the latter to engage one of the notches 250 of the bar. The bell crank 257 is pivoted at 259 to an arm 260. After the initial engagement of the arm 258 and one of the notches of the bar 250 further movement of the rod 256 to the right will cause the arm 260 to be rocked a step of movement and by the arm 258 shift the bar 144 a step of movement in which position it will be held by means of the holding pawl 258. The ordinal relationship between the columns of the multiplicand representation and of the accumulator wheels will now be changed so that the successive multiplicand entries under control of the tens denomination multiplier digit will be effected beginning at the tens order of the accumulator wheels instead of the units order accumulator wheel. It is also clear that when the bar 144 is shifted a step of movement the contact finger 158 will now be coordinated with the electrical wiring connection leading to the card column representing the tens multiplier digit. Therefore, successive multiplicand entries will be under control of the tens multiplier digit and multiplying operations will therefore continue until the desired product has been obtained.

It is also pointed out in the event that the multiplier digit should have a "0" value contacts 153 and 182 will not be separated. Therefore, the current impulse effected by the contacts 205 will be transmitted, in the cycle of machine operation the multiplier digit is sensed, to the magnet 252 to immediately secure the desired change in denominational relationship between the multiplicand controlling card columns and the denominational elements of the accumulators.

In precisely the manner explained, successive multiplying operations will be effected under control of the remaining digits of the multiplier, there being one reciprocation of the brushes 64 to sense the value of the multiplier digit, and none, one, or a subsequent series of brush reciprocations to effect multiplicand entries in the accumulators #1 and #3.

Printing of product automatically

It will be also obvious that the bar 144 is shifted a step for each denomination of the multiplier after the units denomination digit has been determined. The present machine is capable of effecting multiplication by a multiplier value representing eight denominations and if it is not known in advance the number of denominations comprising the multiplier value after the multiplicand entries controlled by the last denomination of the multiplier, there is an alternate shifting of the bars 143 and 144 under control of the magnets 151 and 252 respectively, until the bar 144 occupies its extreme right hand position. When the bar occupies such a position product printing operations will be automatically instituted in a manner to be later described.

To the bar 144 and insulated therefrom there is secured a plunger 270 (Fig. 11) composed of metal in which there is fitted a spring pressed finger 271 in continuous contact with a metal plate 272 and a spring pressed plunger 273 which is adapted to successively contact with a series of contact points 274 carried by a bar 275 of insulating material. The contact points 274 have wire connections 276 to a series of cycle limiting plug sockets 277.

There is also provided a special plug socket 278 which has a wire connection to the positive line side 182. If the number of multiplier digits is not known in advance, a plug connection 279 is made from the plug socket 278 to the extreme right hand plug socket 277. It is therefore obvious that when the plunger 273 engages the contact point 274 at the extreme right, a circuit will be made from the positive line side to such contact point 274 through the plungers 273, metal bar 270 and plunger 271 to the metallic contact plate 272 and thence by a wire 280 (Fig. 1a) to the motor control relay magnet 186 and thence to the negative side of the line. It will be recalled when this magnet is energized contact 86a are opened and the reset motor RM is automatically set into operation to accomplish functions hereinafter to be described.

If, however, it is known in advance the number of denominations comprising the multiplier factors, a suitable plug connection may selectively be made to a socket in the row of sockets 277 (Fig. 11) to thereby limit the number of multiplying operations to the number necessary to secure the product.

If the number of denominations of the multiplier factor comprises six, for example, the plug wire 279 will be inserted in the sixth socket 277. Therefore, at the sixth step of bar 144 the plungers 271 and 273 will bridge the contact plate 272 and the contact point 274 of the plug socket 277 involved. Thus the circuit connection necessary to secure the automatic printing of the product is made after the last multiplying operation.

*Selective accumulator entries*

There will now be described the means whereby the five accumulators of the machine are normally connected so that their controlling magnets and related printing magnets are all connected to the positive side of the line in order that when the machine is not set for multiplication, the accumulators and printing magnets may be plugged for additive entries under control of related card fields.

Referring now particularly to Fig. 1 and recalling that the accumulator control magnets and printing control magnets have connections through the brushes 64 to the negative side of the line, it will be seen that the customary (noting Patent No. 1,762,145) permanent connections to the positive side of the line are disconnected and that for counters #1 to #5 inclusive, there is provided separate wire connections 281, 282, 283, 284 and 285 (see Fig. 1). Wire connections 281 and 283 are connected to a bus bar 287 and wires 282, 284 and 285 are connected to a bus bar 286. There is also provided a wire connection 288 from the bus bar 286 through contacts 289 which are normally closed when multiplying operations are not effected and from such contacts 289, a wire connection 290 leads to the positive line side 182. When the machine is not set for multiplying operations, a magnet 291 is deenergized to permit closure of contacts 292, such contacts adapted from the wiring connection shown in Fig. 1 to electrically connect bus bars 286 and 287. Therefore, when the machine is not set for multiplying operations all of the accumulator control magnets and printing control magnets have connections to the positive line side through normally closed contacts 289.

Recalling now that when the machine is set for multiplying operations, contacts 123 are closed, it will be seen that the circuit from the positive line side is extended by a wire 293 to the magnet 291 and thence from such magnet to the negative line side. This causes contacts 292 to be opened so that the effectiveness of accumulators #1 and #3 is controlled by contacts 294 and the effectiveness of accumulators #2, #4 and #5 is controlled by contacts 289 since the latter has a connection from the positive line side by wire 290 and a wire connection 288 from its other contact point to the bus bar 286.

Figure 9A:
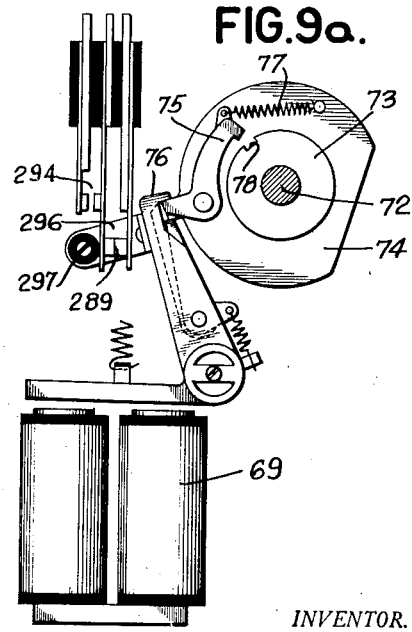
Fig. 9a is a detail view showing the manner in which certain contacts are controlled by the clutch of Fig. 9.

Referring now to Fig. 9a, it will be seen that the plate 296 which carries the roller 137 is also provided with a supplemental roller 297 adapted when the magnet 69 is energized to cause contacts 294 to close and contacts 289 to be opened.

Remembering now that as long as multiplying operations are effected that the brush reciprocating control magnet 69 is continually energized, it is evident that since contacts 294 are closed, multiplicand entries will be effected in the accumulators #1 and #3. Since contacts 289 are kept open it is evident that entries of the multiplier and the multiplicand factors in accumulators #2 and #4 will be suppressed until a later point in the machine operation.

Further details of the manner of operation of the accumulators will now be given, although such is well known in the art to which this invention appertains.

Figure 18:
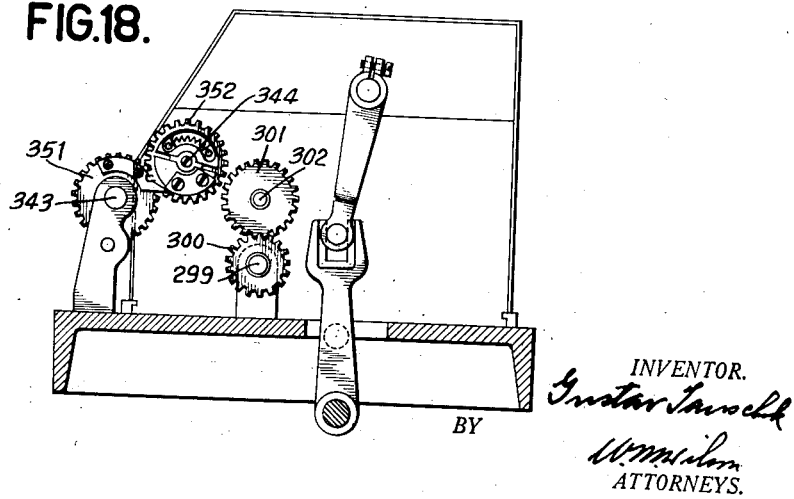
Fig. 18 is an end view of one of the accumulator units and discloses the gear connections for driving the accumulator elements and for accomplishing the resetting of the latter.

Observing particularly Fig. 4, the gear 111a is adapted to drive a gear 298 secured to a transverse shaft 299 which is adapted to drive the accumulating elements of the five accumulators. To the shaft 299 there is secured a gear 300 (Fig. 18) in mesh with a gear 301 of the accumulator drive shaft 302 (see also Fig. 19).

The construction of the accumulators employed in the present machine is well known in this art and is fully disclosed in the patent to C. D. Lake, No. 1,307,740, dated June 24, 1919, to which reference should be made for details of construction and operation. For the understanding of the present invention, it is sufficient to observe that the shaft 302 through intermeshing gears 303 is adapted to drive the accumulator wheel 304 a differential extent. The differential movements of the accumulator wheels are controlled by accumulator magnets 305 adapted to control a clutch device designated generally by the reference character 306. The clutch device effects a connection between the shaft 302 and the accumulator wheel 304 which is to be driven. Each accumulator wheel has a gear connection to a total representing stepped cam 307. The shaft 302 is driven synchronously with the passage of the analyzing brushes 64 over the card so that the instant in the cycle a perforation indicating a given number is encountered by the brush it will determine the point in the revolution of the shaft when it is clutched into gear with its accumulator wheel 304 and this will determine the number of steps or spaces that each wheel will then be turned corresponding to such number.

Figure 19:
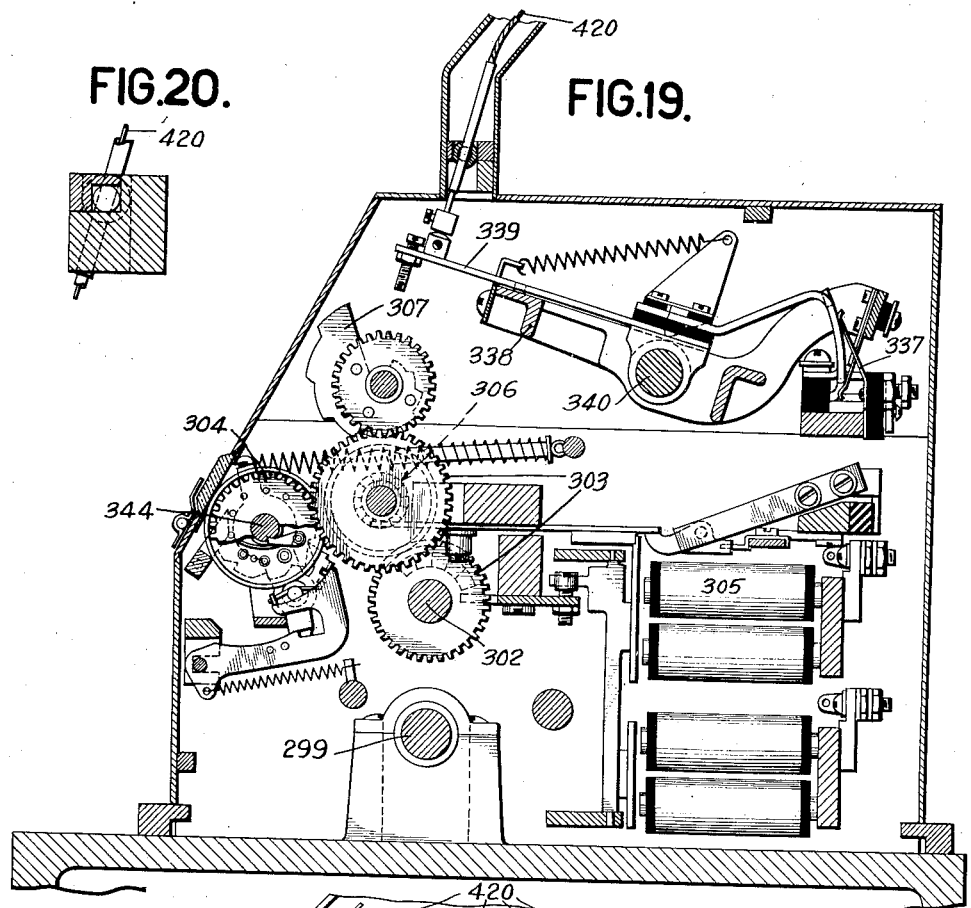
Fig. 19 is a cross sectional view of the product accumulator and is taken on the line 19—19 of Fig. 2.
Figure 21:
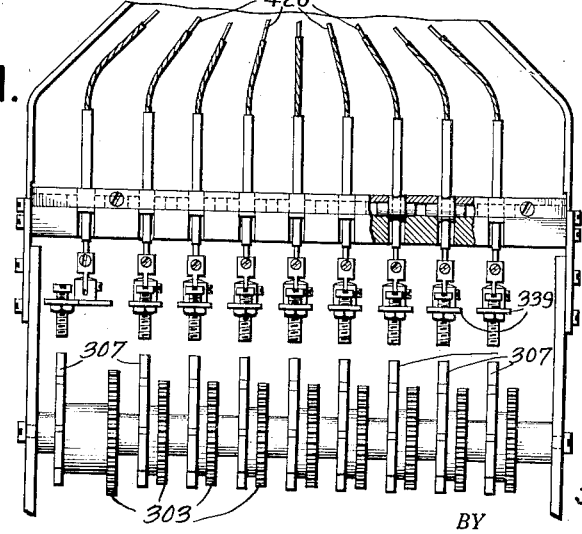
Fig. 21 is a front view in elevation of certain of the mechanisms disclosed in Fig. 19.
Figure 26:
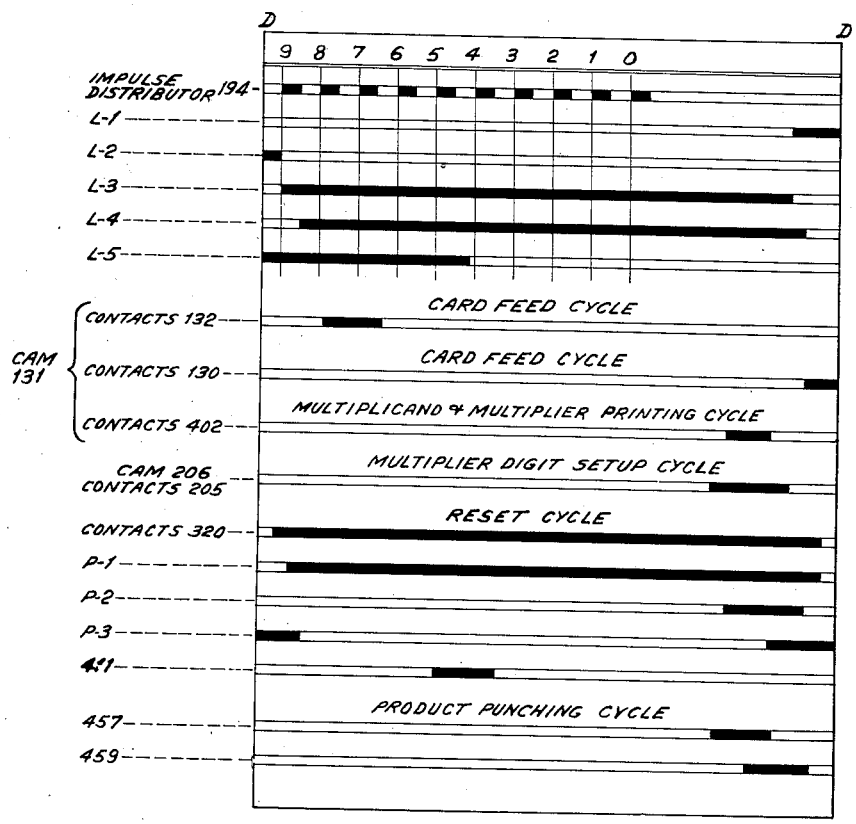
Fig. 26 is a diagram disclosing the timing of electrical contacts.

The driving, the clutch devices, the transfer, and other mechanisms embodied in the accumulator shown in Fig. 19 are all well known features of the prior art.

As previously stated, observing now the wiring diagram, there are provided plug connections 230 to the accumulators #1 and #3 both of which receive the multiplicand entries. Connections to the accumulator control magnets 305 are also shown in the wiring diagram.

*Automatic printing of the product—Continued*

Still referring to the wiring diagram it will be noted that when the last multiplicand entry has been made the switch device comprising elements 270—279 (Fig. 11) will connect the positive line side 182 to a wire 308 which causes the energization of a magnet 309 since the latter is connected by a wire 310 to the negative line side 183. It will be clear from Fig. 10 that when the magnet is energized contacts 127 will be opened removing the positive line side from the brush reciprocating control magnet 69 (see Fig. 1). Thereupon contacts 113 (Fig. 9) close so as to cause the energization of the card feed clutch control magnet 23 (Fig. 8). It is evident that while magnet 23 is energized no card feed will ensue because the T. M. motor will be stopped automatically after the last multiplying operation. The clutch connection is, however, effective and ready to again feed the card after the product printing cycle. Since magnet 23 is energized contacts 138 also open removing the negative line side 183 from the brush reciprocating control magnet 69.

The motor R. M. is shown in Fig. 22. This through a shaft and worm 311 drives a worm wheel 312. Fixed to worm wheel 312 is a ratchet disk 313. Fast on a shaft 315 is a so-called printing cam 314. Fast on this printing cam is a bar 316 which in turn carries a clutch dog 317. The clutch dog 317 overlies the ratchet wheel 313 and is normally disengaged therefrom. Engagement of the clutch dog 317 with the ratchet wheel 313 is permitted when a reset clutch magnet 318 is energized.

The armature 319 of the magnet has connected to it an arm which is notched to engage a projection of the clutch dog 317 to permit when the arm is moved the effectiveness of the clutch so as to cause shaft 315 to be driven a complete revolution. The circuit connections for causing clutch magnet 318 to be energized upon a product printing or reset and total taking cycle are well known in the art and fully described in the prior Patent No. 1,762,145. However, a later reference will be made to this circuit.

The actuation of the total print shaft 315 derives the product amount from accumulators #1 and #3 and resetting of one of said accumulators.

Referring to the wiring diagram when shaft 315 is turned a cam (Fig. 1) revolves to close contacts 320. Thus an impulse is directed by wire 117 to cause magnet 118 to be energized for almost a complete total taking cycle. This will cause contacts 123 to open which open the circuit to magnet 291. Since magnet 118 is energized pawl 248 (Fig. 11) is elevated to permit bar 144 to return to normal. When magnet 291 is deenergized contacts 292 close connecting the positive line side 182 through contacts 289 which are now closed since magnet 69 has been deenergized.

Figure 17:
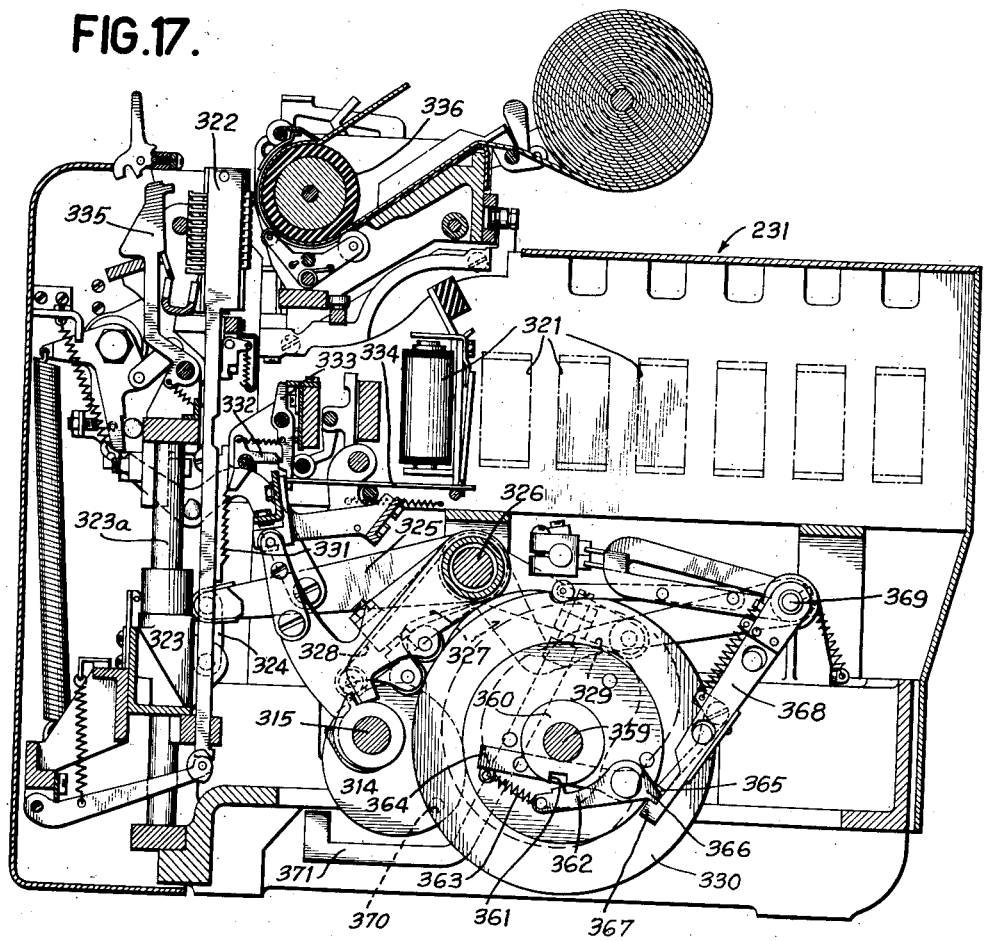
Fig. 17 is a sectional view of the printing section of the machine, the section being taken substantially on line 17—17 of Fig. 2.

The printing cross head 323 (Fig. 17) is mounted for vertical reciprocation on guide rods 323a and is connected by links 324 to arms 325 which are secured to a shaft 326. Shaft 326 has secured thereto a double arm member 327, one arm of which cooperates with a follower arm 328 actuated by the cam 314 and the other arm cooperates with a cam follower 329 actuated by a cam groove in a listing cam 330. By virtue of this construction, it is apparent that the shaft 326 may be rocked under control of either of the cams 314 or 330.

The type bars 322 are mounted in the cross head 323 and are suitably guided therein for vertical reciprocation. The type bars are each provided with a plurality of ratchet teeth 331 which cooperate with stopping pawls 332 and are unlatched by a member 333 shiftable, when a printing control magnet 321 is energized, through the interconnection consisting of a call wire 334. The construction and operation of the printing mechanism is also fully shown and described in the aforesaid patent to Daly et al. 1,762,145. For the understanding of the present invention, it is sufficient to understand that the printing type bars 322 are elevated by means of the cam 314 and differentially stopped so that by means of printing hammers 335 the selected type bar may be shifted to print the product and accumulated product upon the paper carried by a platen 336. From the wiring diagram, it will be observed that the printing control magnets 321 related to accumulators #1 and #3 are adapted to be energized at differential times under control of total contacts 337, and the time of closure of contacts 337 is determined by the position of the total representing cams 307 of the accumulators (see also Fig. 19).

In order to suppress total printing from accumulators #2 and #4 the zero button levers 500 of these accumulators are moved to open the related zero button contacts 501, which expedient is well-known and fully explained in the Patent #1,762,145.

The manner in which product printing is effected under control of the product representing cams of an accumulator is also well known in the art and is fully shown and described in the patent to C. D. Lake, No. 1,379,268, dated May 24, 1921. In general, as the type bars 322 are being elevated, a bail 338 (Fig. 19) permits a series of feeler arms 339 to be rocked about a shaft 340 until such arms cooperate with the profiles of their respective total representing cams 307 at which time the contacts 337 will close thereby causing the energization of the related printing control magnet 321, the type bars thereby set to represent the value of the digits on the multiplicand accumulators #1 and #3. These amounts are printed upon the record strip to represent the product of the factors involved in the multiplying operation, and also the total of the products of successive complete multiplying operations.

From Fig. 2, it will be recalled that the printing bank 231 will print the product and the printing bank 232 will print the accumulated products, both on a single line.

After the product of a particular multiplying operation is entered in one of the product accumulators, it is desirable that such accumulator be reset to zero. The devices for resetting the accumulator are also well known in the art and are fully shown and described in the last mentioned patent to C. D. Lake, No. 1,379,268. In the present machine and that of the patent the shaft 315 carries a mutilated gear 341 (Fig. 23) which has a driving engagement with a gear 342 mounted at the extremity of a reset shaft 343 which actuates the resetting mechanism of the accumulators. The relationship between the gears 311 and 342 is such that the shaft 343 is driven through one revolution during the second half of the revolution of shaft 315, it being understood that the printing mechanism is operated by the shaft 315 during the first half of its revolution.

The resetting shaft 343 carries a gear 351 (Fig. 18) adapted to drive a gear 352 on a reset shaft 344 (Fig. 19). To provide a selective clutch connection between the shaft 343 and 344, each accumulator is equipped with a clutch device 345 (Fig. 2). The clutch device 345 of the accumulator #1 is preferably adapted to be placed in effective position so that after a product is printed from such accumulator, its accumulator wheels 304 (Fig. 19) will be restored to zero. The clutch device 345 generally referred to herein is also a well known feature of the prior art and fully explained in the Lake Patent No. 1,379,268.

The clutch device 345 of accumulator #3 is, however, not placed in effective position so that this accumulator will continue to accumulate the successive products of the multiplying operation.

If it is desired not to print the value of the accumulated products each time the product of a particular multiplying operation is printed, a non-list switch 346 (Fig. 1a) related to accumulator #3 is opened. This feature of selective printing under control of the accumulators is also a well known feature in the art and, therefore, is generally described herein. For further details of construction and operation see the patent to G. F. Daly et al. No. 1,762,145.

The circuit connections by which the R. M. motor is automatically set in operation after the last multiplicand entry will now be explained. Contacts 86a, at this time, are open, it will be remembered.

Hence magnet 55 will be deenergized permitting related contacts 347 to close whereupon a circuit through motor R. M. will be established by the closure of contacts L—1 toward the end of the last multiplicand entry cycle, this circuit extending through contacts 347, contacts L—1, stop key 187 and through contacts P—3. Early in the cycle contacts P—3 open but by this time contacts P—1 have closed maintaining the reset motor in operation for one complete cycle during which product printing is effected. Since the bar 144 is now restored to normal and the positive line side is removed from the motor control magnet 186 the latter is de-energized and contacts 86a closed. A circuit now to be outlined will, through card lever contacts 63 and 114 cause the automatic operation of the tabulating motor to be resumed, owing to the closure of contacts P—2 at the end of the resetting cycle. The initiating circuit in this case extends from the positive line side 182, through the motor T. M., relay coil 104, clutch magnet 55, motor relay coil 185, auto restart switch 348 to cam contacts P—2, thence to rear card lever contacts 114, forward card lever contacts 63 (or contacts L—5 if contacts 63 are not closed) motor relay contacts 86a now closed, stop key 187, and across contacts P—3 which have been closed, back to the negative line side 183.

At the termination of the reset cycle when the product and accumulated products have been printed contacts 320 open and as the card is still beneath the brushes 64 card lever contacts 115 are still open.

As a result of the open circuit connection to magnet 118 contacts 123 again close to thereby cause magnet 291 to be energized. Contacts 292 now open and as there has been no change in the position of contacts 289, which are now closed, the wires 282 and 284 relates to accumulators #2 and #4 are connected to the positive line side through wire 288, closed contacts 289, wire 290 to the positive line side 182. Accumulators #2 and #4 are now electrically connected to receive the multiplicand and multiplier entries under control of the moving card.

*Printing of multiplicand and multiplier amount*

In view of the fact that the tabulator motor T. M. is now in operation, the different sets of feeding rollers will be rotated so that the tabulating card involved in the multiplying operation will be fed past the brushes 64 which are now stationary. As the perforations designating the multiplier are sensed by the brushes 64 electrical impulses will be transmitted to the accumulator control magnets 353 and the printing control magnets 354 of printing bank #2. To transmit such electrical impulses, suitable plug connections 355 are made to brushes 64 (Fig. 1a). Therefore, the multiplier amount will be entered in the accumulator #2 and the printing type of printing bank #4 will be adjusted to represent the multiplier amount. Also in the same manner under control of the perforations representing the multiplicand amount, the accumulator control magnets of accumulator #4 and the printer control magnets of printing bank #6 will be energized under control of brushes 64 so that the multiplicand amount will be entered in accumulator #4 and printed by the related printing bank #6. The manner in which the printing mechanism is automatically operative after a total and reset cycle will now be described.

As more fully explained in the patent to G. F. Daly et al. No. 1,762,145, the machine is equipped with a "List-Tabulate" lever 316 (see Figs. 2 and 22) which is adjustable from a listing position to a non-listing or tabulating position. In order that certain parts of the mechanism be operative to cause an automatic listing operation only in the first cycle after a total taking and reset cycle it is necessary that this lever be in the tabulating position.

As is best shown in Fig. 22, secured to the drive shaft 299 is a gear 356 driving a gear 357. The latter is adapted to drive an intermeshing gear 358 secured to a listing cam shaft 359.

Fixed to the listing cam shaft 359 adjacent the listing cam 330 previously referred to is a clutch disk 360 (see Fig. 17) provided with a notch 361. Listing cam 330 is loose upon the listing cam shaft 359 and during listing operations this listing cam is clutched to shaft 359 by means now to be described.

Pivotally mounted upon the listing cam 330 is a clutch member 362 normally drawn into engagement with disk 360 by means of a spring 363 which at its opposite end is fast to a part 364 extending over and terminating in a nose 365. The clutch dog 362 is provided with a tail or pawl portion 366 which is normally adapted to cooperate with a shoulder portion 367 upon a rocking lever 368. For a single listing operation followed automatically after a total taking and reset cycle lever 368 is in the position shown in Fig. 17. With the parts in this position, clutch dog 362 is out of engagement with the notch 361.

The lever 368 is fixedly mounted upon a shaft 369 which shaft is journalled in the frame of the machine. Attached to the cam 314 which it will be recalled makes a single rotation during total taking operations, is a pin 370 which is adapted to engage the free end of an arm 371 which is secured to shaft 369 to rock the shaft in a counterclockwise direction and release clutch dog 362 for engagement with the clutch element 360.

This action is effective to permit the printing mechanism to be adjusted during the next cycle of operation since it will be recalled that the listing cam 330 operates upon a follower carried by the arm 329. Rocking of this arm causes the double arm 327 and shaft 326 to be rocked to elevate the type carriers 322. The latter when differentially adjusted have their selected type struck by the hammers 335 so as to print the multiplicand and multiplier factors on the same printing line on which the product was previously printed.

Since the rocking of arm 371 by pin 370 is momentary, the shaft 369 will return to its latching position and the cam 330 will come to rest after a single revolution.

*Paper spacing mechanism*

It is preferable to print the multiplier factor and related product on a single line and to this end the paper spacing mechanisms disclosed in the patent to G. F. Daly et al., No. 1,762,145 is suitably modified to carry out the desired object.

The control of the paper feeding mechanism, its construction and operation are as follows: Link 372 (see Figs. 22 and 23) at its upper end is connected to an arm 373 carrying a pawl 374 cooperating with a ratchet wheel 375 attached to the printing platen 336. When the link 372 is depressed, the pawl 374 engaging a tooth of the ratchet wheel 375 will turn the platen a single step of movement. At its lower end, the link 372 is connected to a lever 376 pivoted at 377 on a fixed bracket plate 378. Secured at 379, to lever 376 is an L-shaped member 380 which is pivoted at 377. Secured to the lever 376 at 381 is a supplemental L-shaped member 382 which is pivoted at 383 to an extension of the lever 376. The connections 379 and 381 are merely adjustable screw connections so that when the parts 376, 380 and 382 are once adjusted, they operate as a single unit about the shaft 377 and this unit is actuated in the present case by the rocking of the shaft 326 during the product printing cycle.

It should be observed that the listing cam 330 is not effective during the multiplying operations, that is, when the multiplier digit is being sensed and when successive multiplicand entries are being effected, so that as a result there is no operation of the shaft 326 and no paper spacing operations will be effected. During the product printing cycle, shaft 326 will be rocked so that an arm 384 secured to shaft 326 will be rocked in a clockwise direction. The arm 384 carries a pin 385 in abutting relationship with a shoulder of an integral extension 387 of the L-shaped member 382.

The machine is provided with a bracket plate 388 (Fig. 24) carrying a pivot stud 389 and on said pivot are carried a plurality of latching members 390 and 391 each of which below pivot 389 is of the form shown in Fig. 23. However, the member 391 is provided with an upstanding integral member 392 and also has secured thereto a block 393. The various functions of the latching member 391 which are performed under control of the "List-Tabulate" switch 316 are fully described and disclosed in the patent to G. F. Daly et al., No. 1,762,145, and for the understanding of the present invention, it should be noted that to provide for the desired single paper spacing operation as an incident to multiplying operations, this latch member 391 is placed in a position where its usual function is disabled. To prevent the usual function of latching member 391 there is connected to the integral extension 392 a pull rod 394 having a knob 395 at its end so that the latching pawl 391 will be rocked and held in disabled position. The latching pawl 390, however, remains in its effective position shown in Fig. 23. The latching member 390 has an integral rearward extension 396 and attached thereto is an armature 397 of a magnet 398.

It should be observed that during the revolution of the cam 314 (Fig. 17) shaft 326 will be rocked thereby rocking the paper feeding unit counterclockwise about the shaft 377 drawing link 372 downwardly so that the pawl 374 will feed the paper a single step of movement thereby separating the last line of print, if made, from the next print to follow.

During the same product printing cycle after the spacing has taken place, printing of the product is effected. As the paper spacing unit is rocked in a counterclockwise direction, a block 399 attached to the L-shaped plate 382 becomes locked in a recess 400 of the latching member 390. The paper spacing link 372 will thereby be held downwardly in latched position. Having thus suppressed the operation of link 372 by the latching of block 399 by recess 400 the line on which the multiplicand and multiplier has been printed remains in printing position so that the factors of the multiplication are eventually printed on the same line as the related product or result.

Referring now particularly to the wiring diagram, it will be observed that the paper spacing control magnet 398 is electrically connected at one side to the positive line side 182 and thence through a manually set switch 401 to the negative line side 183 through contacts 402 closed by the cam 131. When spacing operations are to be effective as desired, switch 401 is closed manually. During the listing cycle effective after the product printing cycle, contacts 402 close to cause the energization of the magnet 398. This will cause the counterclockwise rocking of the latching member 390 about its pivot stud 389 releasing block 399 and allowing lever 376 and attached members including link 372 to assume by means of a spring 403 (Fig. 23) normal positions with the shoulder 387 against pin 385. It is evident that, therefore, as a result of the operation of the above described mechanism only a single line space will be given to the paper sheet.

*Product punching device*

It is desirable to have the value of the product also represented by perforations on the same card from which the factors are derived. The preferred form of mechanism for accomplishing this function will now be explained.

From the wiring diagram it should be noted that such a punching operation will be effected when a switch 410 is closed. When this is done, during the product printing cycle contacts 411 will be closed to transmit an electrical impulse from the positive line side 182 by a wire 412, switch 410, to a magnet 413 connected to the negative line side 183 by a wire 414. The energization of magnet 413 will cause a switch element to rotate to close contacts 415 and a circuit from the positive line side 182, through contacts 415 and card lever contacts 416, to product punch control magnet 417, which has a wire connection 418, to the negative line side 183 through closed contacts 138 and the wire connection 140.

When the card is in the proper position in the product punching mechanism contacts 416 are closed by the card to cause the product punch clutch to be effective at the beginning of the next cycle. As such card is stationary during the punching cycle, it is necessary to stop the card feed in the following cycle and to this end magnet 417 when energized opens contacts 111 to open the circuit to card feed magnet 23. Hence there is no card feeding operation during the product punching cycle. However, the brush control magnet 69 can be energized so that the controlling mechanism is operative to set up the multiplier digit of the following card during the product punching cycle.

The construction of the total punch clutch is similar to the clutch device shown in Fig. 8. As shown in Fig. 3 its magnet 417 attracts an armature 419 to permit contacts 111 to open. The construction of the clutch pawl (like 26 of Fig. 8) and the clutch disk (like 21 of Fig. 8) is similar to that previously described for any clutch device. It should be noted that when the clutch is effective the shaft 30 is rotated a complete revolution by the driven element of the clutch.

Figure 20:
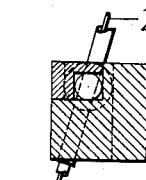
Fig. 20 is a detail view showing the manner of support and guide for a Bowden wire associated with the total punching mechanism.

During the product printing cycle, it will be seen from Fig. 20 that the arms 339 which are rocked differential amounts draw downwardly Bowden wires 420 connected thereto. The ends of the wires 420 are connected as shown in Fig. 5 to slidably mounted plates 421. A pin 422 on a plate 421 engaging the arm of a bell crank 423 rocks the same so as to shift longitudinally to the left a mechanically connected punch selector 424. The shifted position of the selectors is held by spring pressed pawls 425. Each selector has a punch selecting projection 426 which overlies the upper end of a selected punch 427 of a correlated row of punches.

The product receiving accumulator #1 has nine accumulating elements and adjusts a corresponding number of punch selectors 424.

The card to be punched passes between the lower ends of punches 427 and a stationary die plate 428.

The die plate 428 is provided with as many rows of holes as columns may be punched in the card while a fewer number of rows of punches 427 are provided. Nine of the thirty rows of punches are under control of the product accumulator #1. The remaining twenty one sets of rows of punches can be manually selected to punch fixed data. This is provided for by manually shifting the selectors 424 to appropriate positions as will be explained.

It is necessary that the punching unit be capable of punching in any selected or unused card field. A suitable construction provides this desirability.

The punching unit includes a bar 429 (Fig. 5) of an inverted T shape. The ends of the bar 429 slide in slots 430 (Figs. 3, 4 and 5) in the side frames 56 and 57. Bar 429 has connected thereto links 431 (Figs. 3 and 4) each of which has an eccentric connection 432 to the punch operating shaft 30. The bar 429 has attached thereto blocks 433 and 434 (Fig. 5) which fit in between the side frames 56 and 57. The punching unit includes two sides frames 435 and 436 (Figs. 4 and 5) which are recessed to receive the parts 429, 433 and 434 and are, therefore, slidably mounted transversely on and along such parts. The side frames 435 and 436 are connected together by cross frames 437, 438, 439 and 440 which are supports for certain parts of the punching device and provide a rigid movable punching unit.

The side frames 435 and 436 also carry a stripper plate 441. The guide plates 442 and 443 for the punches are also carried by side frames 56 and 57.

Obviously eccentrics 432 depress the punching unit so that projections 426 depress the selected punches to force them through the card. At this time stripper plate 441 also moves downwardly but on its return elevates the depressed punches thus positively withdrawing them from the holes made in the card.

It is pointed out that the punches 427 which are not selected for operation are either held up by frictional means or else rest lightly upon the surface of the card which is being punched.

At the end of the punching operation, the shifted punch selectors 424 are unlatched so that they are returned to their normal positions and which operation is accompanied by the zeroizing of the accumulator elements of the product accumulator #1. After the punching operation, a magnet identified by 444 (Fig. 4) is energized so as to attract its armature 445 which through a link 446 and connected arm 447 rocks a shaft 448 secured to said arm. Also secured to the shaft 448 is another arm 449 which is connected by a link 450 to a pawl operating bar 451 (see also Fig. 5). When the bar 451 is rocked, the pawls 425 will be shifted so as to be disengaged from the ratchet teeth formed at the bottom of the punch selectors 424. At this time, the punch selectors 424 are free to be restored to their normal positions.

Referring now to Fig. 19, it will be clear that when the bail 338 is restored to its normal position the Bowden wires 420 will force the plates 421 to their normal positions. At this time, springs 452 are effective to operate upon the bell cranks 423 so as to return the punch selector bars 424 to their normal positions.

As has been premised before, certain of the punch selectors 427 which are not operatively correlated with accumulator #1 are manually shifted to the desired positions so that fixed data may also be punched upon one or a series of tabulating cards. When a particular selector has been so shifted a manually operable pawl 453 is rocked so that a portion 453a thereof will engage one of the ratchet teeth 454 formed at the end of the shifted punch selector 424. A spring-pressed arm 455 will hold said manually operated pawl 453 in its position of adjustment. It is obvious, therefore, that while the pawls 425 of the selector plates 424 which have been manually shifted are operated, such selectors will remain in their positions of adjustment as long as each of the manually set pawls 453 remain in the position shown in Fig. 54. By a reverse movement of the pawls 453 said punch selectors 424 may be released for return to a normal position by their springs 452.

The electrical circuit connections for causing the energization of the magnet 444 will now be described. Secured to the punch operating shaft 30 is a cam 456 (Fig. 1) adapted to close contacts 457 thereby extending a circuit connection from the positive line side 182 through such contacts 457 to the magnet 444, the latter being connected by a wire 458 to the negative line side 183.

The cam 456 is also adapted to close contacts 459 thereby causing a second energization of the magnet 413. This magnet thereupon attracts its armature so as to turn the switch element thereby opening the contacts 415 and the circuit connection to the total punch magnet 417. Contacts 111 now close so as to cause the energization of the card feed clutch magnet 23. At the beginning of the next cycle, the card feed clutch will be energized so as to cause the operation of two sets of feeding rollers 455 (Fig. 5) thereby causing the card which has just been punched to be fed out of the punch unit and into a hopper 460.

In order to laterally adjust the punching unit to cause punching in the desired card field, there is provided a worm wheel screw shaft 461 (Figs. 5 and 6), said screw shaft being rotatably mounted in portions of the punch unit side frames 435 and 436. To the side frame 435 there is secured a plate 462 (Fig. 6) carrying a worm nut 463 in which the worm screw 461 is threaded. One end of the worm screw 461 has secured thereto, as best shown in Fig. 3, a crank arm 464, said arm having a manually operable handle 465. The crank arm 464 obviously is rotated by handle 465 until the punching unit is in the desired position. A scale 466 (Fig. 6) informs the operator the position of adjustment of the punching unit. When the punching unit has been moved to the proper position, the handle 465 is at the position shown in Fig. 3, and locked by suitable means so that the punches will be in correct alignment with the holes in the die plate 428.

*Summary of operation*

While the preceding description is clear in the operation of the machine a general summary of the operation of the machine will now be given.

The operator will, for multiplying operations, first close the switch 181 (Fig. 1a) to energize the card feed clutch magnet 23 and also close the switch 124 (Fig. 1).

The operator then depresses the "Start key" (Fig. 1a) to energize the clutch magnet 55 and engage the main one revolution clutch 184 (Fig. 3) so that by the card feed clutch the card is fed from the magazine (Fig. 5) to the brushes 54. By a second cycle of operation initiated by the "Start key" the card is then fed past said brushes 54 to the analyzing brushes 64 and stopped in position beneath the brushes 64.

During the cycle of operation in which the said card is fed beneath the brushes 64 contacts 130 (Fig. 1) close to energize the magnet 69 (Fig. 9a) so as to cause the operation of the brush reciprocating mechanism shown in Fig. 4 and which is operated by the cam 89.

The contact point 158 (Fig. 1) is in such a position that at the first reciprocation of the brushes 64 the magnet 160 (Fig. 13) will be energized at a differential time when a perforation is encountered in the first multiplier digit column. This will cause the contacts 153 and 189 (Fig. 1) to be separated a distance, say six steps in the previous example assumed for a multiplier digit of "6".

The reciprocation of the brushes 64 will now continue and with the bar 143 in the position shown in Fig. 1 multiplicand entries in the products accumulators are successively effected, since contacts 294 (Fig. 1) are now closed, and under control of the columns of multiplicand representing perforations which are analyzed by the correlated brushes. For each multiplicand entry an impulse is sent to magnet 219 (Figs. 1 and 12) which will bring the contacts 153 and 189 one step closer together for each multiplicand entry.

At the sixth multiplicand entry the contacts 153 and 189 will engage which will cause magnet 151 to be energized so as to shift the bar 143 to the left to cause the next multiplier digit set-up operation, in the manner just described.

During the last multiplicand entry operation an impulse is sent to a magnet 252 (Fig. 1) which causes the shift of the column shift bar 144 so that contact point 158 will be correlated with the tens multiplier digit representing column and the ordinal relationship will be changed so that the successive multiplicand entries will be effected beginning at the tens order of the accumulator wheels instead of the units order.

Multiplying operations for the successive multiplier digits is effected and when the bar 144 is stepped to a position indicating the completion of the multiplying operations a circuit is closed to the motor control magnet 186 (Fig. 1a) opening contacts 86a and setting the reset motor R. M. into operation. Upon the completion of multiplying operations the brush reciprocating control magnet 69 is deenergized causing the opening of contacts 294 and the closure of contacts 289.

The R. M. (Fig. 22) motor is now in operation and during this cycle of machine operation the printing mechanism (shown in Fig. 17) will print under control of the product accumulators #1 and #3 the product, and if so desired, these accumulators may be reset to zero.

During the product printing cycle shaft 326 (Fig. 23) will be rocked to operate the line spacing mechanism shown in Fig. 22, and the paper spacing link 372 will be held downwardly in latched position by the latching member 390.

After the product printing cycle the multiplicand and multiplier accumulators #2 and #4 receive their respective entries and the values are printed.

The card feed clutch magnet 23 was energized upon the last multiplicand entry to engage the card feed clutch but no card feed ensued because the T. M. motor was thereafter stopped.

At the termination of the product printing cycle contacts P—3 (Fig. 1a) close to transmit an impulse to the motor relay coil 185 which will then initiate the operation of the T. M. motor. The latter will now drive the card feeding rollers to feed the card past the brushes 64. As the perforations representing the multiplier and multiplicand are analyzed by the brushes 64 the correlated printing mechanisms will be set to print these values and the same values are entered in the accumulators #2 and #4. This, of course, is effected because contacts 289 are closed, and their closure is due to the fact that the brush reciprocating magnet 69 is not energized during this cycle of operation.

During this cycle of machine operation the shaft 326 will be rocked but due to the latching of the line spacing mechanism during the product printing cycle no line spacing operation will occur and the multiplicand and multiplier will be printed in the same line as the product.

During this cycle of operation contacts 402 (Fig. 1) close to energize the magnet 398 to disable the latch 390.

The card is fed past the brushes 64 to the punching mechanism and when the contacts 416 (Fig. 1) therein are closed by the card, the punch operating clutch is engaged to operate shaft 30. The card lever contacts 416 (Fig. 1) cause energization of the magnet 417 to open the contacts 111 (Fig. 1) to open the circuit to the card feed magnet 23, and the card is stopped during the punching operation.

Under control of the product accumulator #1 the punch selectors 424 (Fig. 5) are set so as to select the punches 427 for operation and the selected punches 427 are depressed by the plate 434 operated by the shaft 30 and during this cycle of operation the card is perforated to represent the product. At the end of the cycle shaft 30 causes by cam 456 the closure of contacts 459 (Fig. 1) to open by opening of contacts 415 the circuit to magnet 417. Contacts 111 now close to cause the energization of the card feed clutch magnet 23, so that the card feed clutch will cause rollers 455 (Fig. 5) to rotate to feed the card punched with the product into a hopper 460.

What is claimed is as follows:

1. In a machine of the class described, in combination, analyzing means for analyzing a multiplier value on a record, and a multiplicand value on the same record, multiplier digit set-up means, means controlled by the multiplier analyzing means for setting the multiplier digit set-up means, means controlled by the multiplier digit set-up means for reciprocating said multiplicand analyzing means over the record one or more times while the record is at rest in accordance with the digital value of each multiplier digit to secure by repeated addition a product, an accumulator for forming the product by successive multiplicand entries under control of the multiplying means, printing means controlled by said accumulator to print the product, printing means settable under control of the multiplicand and multiplier analyzing means to print the multiplier and multiplicand values, means for causing the record to be fed when the product has been formed, and means for causing the suppression of the operation of the brush reciprocating means while said record is fed whereby said analyzing means analyzes both values while the card is in motion to set the last named printing means.

2. In a tabulating machine, a series of brushes contacting with designations on a record for analyzing said designations while the record is in motion or at rest, means for carrying said brushes, mechanical means for reciprocating the brushes over the record, a plate having cam slots, stationary pins fitting in said cam slots, a mechanical connecting means between said plate and said means for carrying said brushes, and means for shifting said plate and thereby by said cam slots and said pins, causing mechanical connecting means to elevate the brushes in one direction of their movement when the brushes are reciprocated and the record is at rest or when the brushes are at rest and the record is in motion.

3. In a machine of the class described, in combination, a plurality of accumulators, entering means for a product receiving accumulator, means for analyzing a multiplier value on a record while at rest, a multiplier digit set-up means, means controlled by the multiplier analyzing means for setting said multiplier digit set-up means, means for analyzing a multiplicand value on a record while at rest for controlling said entering means, means for operating said analyzing means for analyzing the record, means controlled by said multiplier digit set-up means for causing the repeated operation of the operating means to repeatedly analyze the card to cause the entering means to repeatedly enter multiplicand values in the product receiving accumulator, means for feeding the record to cause the latter to be analyzed in motion by said analyzing means, means for causing the operation of the feeding means at the termination of the multiplicand entering operations, and entering means for the other accumulators controlled by the analyzing means when the latter analyzes the card in motion at the completion of the multiplicand entering operation for entering the multiplier and multiplicand values in the other accumulators.

4. In a machine of the class described, in combination, a plurality of accumulators, entering means for one accumulator, multiplicand analyzing means for analyzing multiplicand data on a record while the latter is at rest to control said entering means, means for analyzing multiplier data on a record while the latter is at rest, multiplier digit set up means controlled by said multiplier data analyzing means for causing said multiplicand analyzing means to control said entering means to cause the latter to successively enter the multiplicand values as successive sub-products in the accumulator controlled thereby to form the complete product therein, means for feeding the record to cause said analyzing means to analyze the record in motion, means for causing the feeding means to feed the record after the multiplying operation is completed, normally ineffective entering means for the other accumulators, and means for causing the last-named entering means to be effective under control of the analyzing means when the record is analyzed in motion to effect the entry of the multiplier and multiplicand values in the other accumulators controlled thereby.

5. In a machine for multiplying multiplier and multiplicand data represented on a record, in combination, an accumulator, entry means therefor, multiplier and multiplicand data analyzing means, multiplying means comprising multiplier digit set up means controlled by said multiplier analyzing means and means under control of said multiplier digit set up means for effecting the multiplication of said multiplier data and multiplicand data derived by said analyzing means for forming the product in said accumulator through its entry means, a printing mechanism, means for causing the operation of the printing mechanism to print under control of the accumulator the product thereon, a supplemental printing mechanism, means for causing said analyzing means to re-analyze the multiplier and multiplicand data on the record after the multiplication is completed, means controlled by the analyzing means when the latter re-analyzes the record for automatically causing the supplemental printing mechanism to print the multiplicand and multiplier data, means for suppressing the operation of the supplemental printing mechanism during the operation of the multiplying means, and means for rendering the last-named means inoperative and for causing the operation of means to cause the analyzing means to re-analyze the record.

6. In a tabulating machine, in combination, a product receiving accumulator, entering means therefor, means for analyzing multiplier and multiplicand data on a card, multiplying means comprising multiplier digit set up means controlled by said multiplier analyzing means and means under control of said multiplier digit set up means for effecting the multiplication of said multiplier data and multiplicand data derived by said analyzing means for forming the product in said accumulator through its entering means, multiplicand and multiplier data receiving means, actuating means to cause the last named means to receive said data, and means for causing said analyzing means to re-analyze the card at the completion of the multiplication to cause said analyzing means to control the last named actuating means.

7. In a tabulating machine, in combination, a product receiving accumulator, entering means therefor, means for analyzing multiplier and multiplicand data on a card, multiplying means comprising multiplier digit set up means controlled by said multiplier analyzing means and means under control of said multiplier digit set up means for effecting the multiplication of said multiplier data and multiplicand data derived by said analyzing means for forming the product in said accumulator through its entering means, multiplier and multiplicand receiving accumulators and entering means therefor, means for causing said analyzing means to re-analyze the card at the completion of the multiplying operation to cause the last named entering means to enter the multiplier and multiplicand data in their respective accumulators, printing mechanisms, and means for causing said printing mechanisms to print the multiplier and multiplicand data under control of said analyzing means when it re-analyzes the card.

8. In a machine of the class described, in combination, data receiving means, means for analyzing multiplier and multiplicand data represented on a card while the latter is at rest, an accumulator, entry means therefor, multiplying means comprising multiplier digit set up means controlled by said multiplier analyzing means and means under control of said multiplier digit set up means for effecting the multiplication of said multiplier data and multiplicand data derived by said analyzing means for forming the product in said accumulator through its entry means, said analyzing means being disconnected from said data receiving means to prevent control thereof during multiplication, means for feeding the card past the analyzing means to analyze the card in motion, means for causing the operation of the feeding means at the completion of the multiplying operation, and means for establishing connections between said analyzing means and said data receiving means to cause the latter to be controlled by the analyzing means when the latter analyzes the card in motion to receive the multiplier and multiplicand.

9. In a machine of the class described, in combination, an accumulator, an entry means therefor, means for analyzing multiplier and multiplicand data represented on a card, multiplying means comprising multiplier digit set up means controlled by said multiplier analyzing means and means under control of said multiplier digit set up means for effecting the multiplication of said multiplier data and multiplicand data derived by said analyzing means for forming the product in said accumulator through its entry means, printing means under control of said product receiving accumulator, means for controlling the operation of said printing means to print under control of said product receiving accumulator the product automatically following the completion of the operation of the multiplying means, means for causing the analyzing means to re-analyze the multiplier and multiplicand data after the operation of the multiplying means and said product printing means is completed, supplemental printing means, and means set in operation when said product printing means has completed its operation to cause said analyzing means to re-analyze the card and to cause the operation of said supplemental printing means to print under control of said analyzing means when the latter re-analyzes the card for the multiplier and multiplicand data.

10. In a tabulating machine, in combination, a product receiving accumulator, entering means therefor, means for analyzing multiplier and multiplicand data on a card, multiplying means comprising multiplier digit set up means controlled by said multiplier analyzing means and means under control of said multiplier digit set up means for effecting the multiplication of said multiplier data and multiplicand data derived by said analyzing means for forming the product in said accumulator through its entering means, multiplicand and multiplier accumulators, actuating means to cause the last named accumulators to receive said data, means for causing said analyzing means to re-analyze the card at the completion of the multiplication to cause said analyzing means to control the last named actuating means, means normally enabling the actuating means of all of said accumulators for effecting entries under control of said analyzing means, means for disabling said enabling means to prevent entries in the multiplicand and multiplier accumulators during multiplication while enabling entries in the product accumulator, and manipulative means conditioned preliminary to multiplying operations for enabling said disabling means.

GUSTAV TAUSCHEK.

CERTIFICATE OF CORRECTION.

Patent No. 2,182,006.     December 5, 1939.

GUSTAV TAUSCHEK.

It is hereby certified that error appears in the printed specification of the above numbered patent requiring correction as follows: Page 14, first column, line 53, claim 2, before the word "mechanical" insert said; and that the said Letters Patent should be read with this correction therein that the same may conform to the record of the case in the Patent Office.

Signed and sealed this 16th day of April, A. D. 1940.

Leslie Frazer
(Seal)     Acting Commissioner of Patents.